US012724594B2

(12) United States Patent
Lavigne et al.

(10) Patent No.: US 12,724,594 B2
(45) Date of Patent: Sep. 1, 2026

(54) DESKTOP-TO-CLOUD APPLICATION MIGRATION

(71) Applicant: FEI S.A.S., Bordeaux (FR)

(72) Inventors: Quentin Lavigne, Bordeaux (FR); Rémi Louis Oukrat, Saint-Loubès (FR)

(73) Assignee: FEI S.A.S., Bordeaux (FR)

( * ) Notice: Subject to any disclaimer, the term of this patent is extended or adjusted under 35 U.S.C. 154(b) by 159 days.

(21) Appl. No.: 18/584,505

(22) Filed: Feb. 22, 2024

(65) Prior Publication Data

US 2025/0272092 A1 Aug. 28, 2025

(51) Int. Cl.
*G06F 8/60* (2018.01)
*G06F 8/41* (2018.01)
*G06F 8/76* (2018.01)

(52) U.S. Cl.
CPC ................ *G06F 8/60* (2013.01); *G06F 8/423* (2013.01); *G06F 8/76* (2013.01)

(58) Field of Classification Search
None
See application file for complete search history.

(56) References Cited

U.S. PATENT DOCUMENTS

2002/0147962 A1* 10/2002 Hatanaka .................. G06F 8/76 717/102
2007/0094372 A1* 4/2007 Hariharan ............. H04L 67/565 709/223
2008/0306986 A1* 12/2008 Doyle, Sr. ................. G06F 8/51 717/136
2010/0313199 A1* 12/2010 Chen ....................... H04L 67/02 717/177
2012/0166963 A1* 6/2012 Kohli ........................ G06F 9/44 715/744
2012/0259909 A1* 10/2012 Bachelor ................ G06Q 10/06 709/201
2015/0378704 A1 12/2015 Davis
(Continued)

FOREIGN PATENT DOCUMENTS

WO WO-2012092117 A2 * 7/2012 ............. G06F 9/451

OTHER PUBLICATIONS

Zhang et al., "Converting Legacy Desktop Applications into On-Demand Personalized Software," 2010, IEEE. (Year: 2010).*
(Continued)

*Primary Examiner* — Qing Chen
(74) *Attorney, Agent, or Firm* — Amin, Turocy & Watson, LLP

(57) ABSTRACT

Systems or techniques are provided for facilitating desktop-to-cloud application migration. In various embodiments, a system can access a desktop application. In various aspects, the system can deploy the desktop application in a cloud computing environment, based on generating a nested model-view-presenter software architecture that treats the desktop application as an outer data model. In various instances, the cloud computing environment can comprise a server device and a client device, wherein the server device can host the desktop application and a portion of an outer presenter, and wherein the client device can host another portion of the outer presenter and an outer view. In various cases, the outer view can comprise an inner view, an inner presenter, and a lite version of the desktop application.

20 Claims, 20 Drawing Sheets

(56) References Cited

U.S. PATENT DOCUMENTS

| | | | | |
|---|---|---|---|---|
| 2016/0026478 | A1 | 1/2016 | Kohli et al. | |
| 2016/0132308 | A1* | 5/2016 | Muldoon | G06F 8/447 717/137 |
| 2018/0157513 | A1* | 6/2018 | Deodhar | H04L 63/0876 |
| 2022/0179683 | A1* | 6/2022 | Verma | G06F 8/76 |
| 2023/0244464 | A1* | 8/2023 | Ulhasrao Deshmukh | H04L 67/34 717/177 |
| 2025/0265103 | A1* | 8/2025 | Mehta | G06F 11/3688 |

OTHER PUBLICATIONS

Kioli, "Nested MVP on Android: how to," <https://stackoverflow.com/questions/43849912/nested-mvp-on-android-how-to 1/>, May 8, 2017, p. 1-4. (Year: 2017).*

Extended European Search Report received for European Patent Application Serial No. 25155517.3 dated Jun. 30, 2025, 13 pages.

Dworak, Hugo, "A Concept of a Web Application Blending Thin and Fat Client Architectures", 2009 Fourth International Conference on Dependability of Computer Systems, 2009, pp. 84-90.

TESCAN "TESCAN TIMA for Mineral Processing" tescan.com, https://www.tescan.com/product/tescan-sem-solutions-tescan-tima-for-mineral-processing/, Last Accessed Feb. 21, 2024, 5 pages.

TESCAN "TESCAN FIB-SEM Tomography" tescan.com, https://www.tescan.com/product/tescan-fib-sem-tomography/, Last Accessed Feb. 21, 2024, 4 pages.

TESCAN "TESCAN 3D Volume Analysis" tescan.com, https://www.tescan.com/product/tescan-3d-volume-analysis/, Last Accessed Feb. 21, 2024, 4 pages.

TESCAN "TESCAN micro-CT Solutions" info.tescan.com, https://info.tescan.com/micro-ct, Last Accessed Feb. 21, 2024, 20 pages.

Jeol "Smile View Map software" jeol.com, https://www.jeol. com/products/scientific/sem/SMILE_VIEW_MAP.php, Last Accessed Feb. 21, 2024, 5 pages.

Temography "Visualizer-evo" Temography.com, https://temography.com/wordpress/wp-content/uploads/2023/06/Visualizer-evo_Brochure_E.pdf, Last Accesesed Feb. 21, 2024, 2 pages.

Jeol "JIB-4000PLUS Focused Ion Beam Milling & Imaging System" jeol.com, https://www.jeol.com/products/scientific/fib/JIB-4000PLUS.php#:~:text=3D%20observation%20function,-The%20JIB%2D4000PLUS&text=The%20optional%203D%20reconstruction%20software,3D%20image%20at%20various%20angles, Last Accesesed Feb. 21, 2024, 15 pages.

Hitachi "Advanced Mineral Identification and Characterization System (AMICS)" hitachi.com, https://www.hitachi-hightech.com/us/en/products/microscopes/sem-tem-stem/mla/amics-software.html, Last Accesesed Feb. 21, 2024, 5 pages.

Media Cybernetics "Image-Pro" Media Cybernetics, https://mediacy.com/image-pro/, Last Accesesed Feb. 21, 2024, 23 pages.

Hitachi "3D Visualization Software Hitachi map 3D" hitachi.com,, https://www.hitachi-hightech.com/us/en/products/microscopes/sem-tem-stem/tabletop-microscopes/map3d.html, Last Accessed Feb. 21, 2024, 9 pages.

Hitachi "Automatic Particle Inspection and Analysis Solution Software EM-AI" hitachi.com,, https://www.hitachi-hightech.com/global/en/sinews/technical_explanation/130307/, Last Accessed Feb. 21, 2024, 7 pages.

Hitachi "Transmission Electron Microscope HT7800 Series" hitachi.com,, https://www.hitachi-hightech.com/us/en/products/microscopes/sem-tem-stem/tem-stem/ht7800.html, Last Accessed Feb. 21, 2024, 4 pages.

Hitachi "Lumada" hitachi.com, https://www.hitachi.com/products/it/lumada/global/en/, Last Accessed Feb. 21, 2024, 7 pages.

Unknown "arivis Vision4D 4.0: Powerful Neuron Tracing with State-of-the-art Performance and Flexibility" Arivis.com, https://www.arivis.com/arivis-news/arivisvision4d40, Oct. 7, 2022, 10 pages.

Zeiss "Zeiss Inspect Optical 3D" zeiss.com https://www.zeiss.com/metrology/products/software/inspect/optical-3d.html, Last Accessed Feb. 21, 2024, 8 pages.

Arivis Cloud "Automated Image Analysis A scalable solution for reproducible results" Apeer.com, https://www.apeer.com/home/, Last Accessed Feb. 21, 2024, 9 pages.

Zeiss "Zeiss Mineralogic Identify Phases and Analyze Texture in 2D and 3D" zeiss.com, https://www.zeiss.com/microscopy/en/products/software/zeiss-mineralogic.html, Last Accessed Feb. 21, 2024, 18 pages.

Zeiss "Zeiss 3DSM" Zeiss, https://www.zeiss.com/microscopy/en/products/software/zeiss-3dsm.html, Last Accessed Feb. 21, 2024, 8 pages.

Zeiss "Zeiss SmartPI" zeiss.com, https://www.zeiss.com/microscopy/en/products/software/zeiss-smartpi.html, Last Accessed Feb. 21, 2024, 12 pages.

Zeiss "Automated Image Segmentation" zeiss.com, https://www.zeiss.com/microscopy/en/resources/insights-hub/manufacturing-assembly/zeiss-zen-intellesis.html, Last Accessed Feb. 21, 2024, 3 pages.

Zeiss "Zeiss Atlas 5" zeiss.com, https://www.zeiss.com/microscopy/en/products/software/zeiss-atlas-5.html, Last Accessed Feb. 21, 2024, 18 pages.

Petapixelproject "Atlas" petapixelproject.com, https://www.petapixelproject.com/, Last Accessed Feb. 21, 2024, 2 pages.

Zeiss "Zeiss Zen Connect" zeiss.com, www.zeiss.com/zen-connect-materials, Last Accessed Feb. 21, 2024, 2 pages.

Zeiss "Faster 3D X-ray data acquisition and superior imaging quality for electronics failure analysis Zeiss DeepRecon Pro" zeiss.com, www.zeiss.com/xrm, Last Accessed Feb. 21, 2024, 2 pages.

Zeiss "Zeiss Labscope for Your Daily Laboratory Work" zeiss.com, https://www.zeiss.com/microscopy/en/products/software/zeiss-labscope/zeiss-labscope-lab.html, Last Accessed Feb. 21, 2024, 17 pages.

Zeiss "Zeiss Solutions Lab" zeiss.com, https://www.zeiss.com/microscopy/en/products/software/zeiss-solutions-lab.html, Last Accessed Feb. 21, 2024, 28 pages.

Zeiss "Zeiss Calypso" zeiss.com, https://www.zeiss.com/metrology/products/software/calypso-overview/calypso.html, Last Accessed Feb. 21, 2024, 7 pages.

Zeiss "Zeiss Lattice Lightsheet 7" zeiss.com, hthttps://www.zeiss.com/microscopy/en/products/light-microscopes/light-sheet-microscopes/lattice-lightsheet-7.htmlutm_source=google&utm_medium=cpc&utm_campaign=C-00011305&gad_source=1&gclid=EAIaIQobChMItPbW35G9hAMV12VHAR0nAAnNEAAYASAAEgl77fD_BwE, Last Accessed Feb. 21, 2024, 25 pages.

Zeiss "Zeiss Correlative Cryo Workflow" zeiss.com, https://www.zeiss.com/microscopy/en/products/imaging-systems/correlative-cryo-workflow.html, Last Accessed Feb. 21, 2024, 23 pages.

Zeiss "Zeiss Celldiscoverer 7 Your Automated Microscope for Live Cell Imaging" zeiss.com, https://www.zeiss.com/microscopy/en/products/imaging-systems/celldiscoverer-7.html, Last Accessed Feb. 21, 2024, 19 pages.

Communication pursuant to Article 94(3) EPC received for European Patent Application Serial No. 25155517.3 dated Apr. 8, 2026, 13 pages.

* cited by examiner

200

PERFORM FIRST OPERATIONS ACCESSING A DESKTOP APPLICATION

202

PERFORM SECOND OPERATIONS DEPLOYING THE DESKTOP APPLICATION IN A CLOUD COMPUTING ENVIRONMENT, BASED ON GENERATING A NESTED MODEL-VIEW-PRESENTER SOFTWARE ARCHITECTURE THAT TREATS THE DESKTOP APPLICATION AS AN OUTER DATA MODEL

204

A

902 TRANSMIT, BY THE INNER PRESENTER, THE USER-INPUT TO THE OUTER PRESENTER

904 UPDATE OR ADJUST, BY THE OUTER PRESENTER, THE DESKTOP APPLICATION BASED ON THE USER-INPUT

906 GENERATE, BY THE DESKTOP APPLICATION, RESULTS IN RESPONSE TO THE UPDATING OR ADJUSTMENT BY THE OUTER PRESENTER

908 TRANSMIT, BY THE DESKTOP APPLICATION, THE RESULTS TO THE OUTER PRESENTER

910 TRANSMIT, BY THE OUTER PRESENTER, THE RESULTS TO THE INNER PRESENTER

B

912 UPDATE OR ADJUST, BY THE INNER PRESENTER, THE LITE VERSION OF THE DESKTOP APPLICATION BASED ON THE USER-INPUT

914 GENERATE, BY THE LITE VERSION OF THE DESKTOP APPLICATION, RESULTS IN RESPONSE TO THE UPDATING OR ADJUSTMENT BY THE INNER PRESENTER

916 TRANSMIT, BY THE LITE VERSION OF THE DESKTOP APPLICATION, THE RESULTS TO THE INNER PRESENTER

C

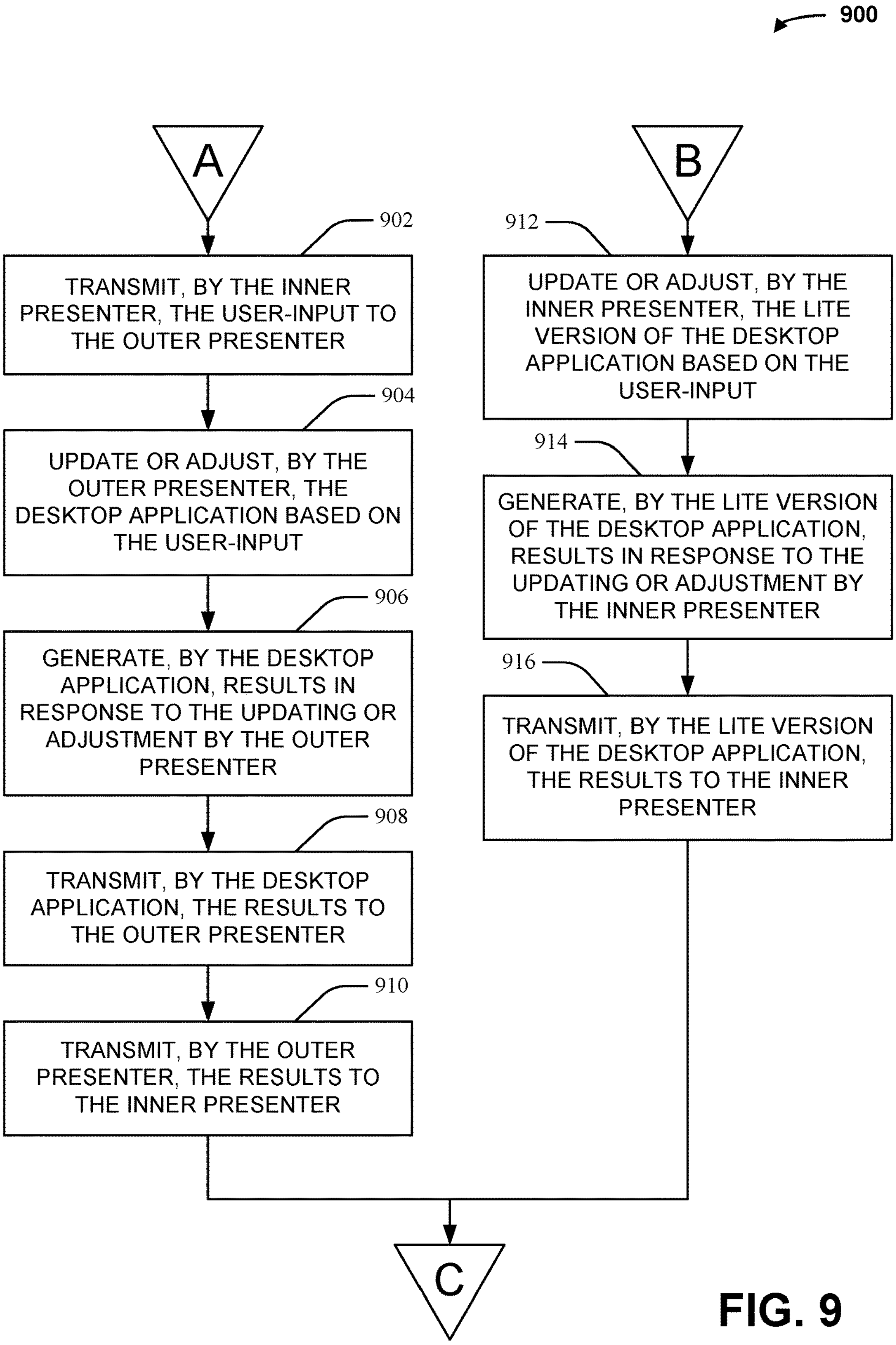

FIG. 9

DESKTOP-TO-CLOUD APPLICATION MIGRATION

BACKGROUND

Scientific instruments are often associated with computer programs. Oftentimes, such computer programs take the form of legacy desktop applications. It can be desired to migrate such legacy desktop applications to a cloud computing environment.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate desktop-to-cloud application migration are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a desktop application. In various aspects, the computer-executable components can comprise a cloud component that can deploy the desktop application in a cloud computing environment, based on generating a nested model-view-presenter software architecture that treats the desktop application as an outer data model.

According to one or more embodiments, a computer-implemented method is provided. In various embodiments, the computer-implemented method can comprise accessing, by a device operatively coupled to a processor, a desktop application. In various aspects, the computer-implemented method can comprise deploying, by the device, the desktop application in a cloud computing environment, based on generating a nested model-view-presenter software architecture that treats the desktop application as an outer data model.

According to one or more embodiments, a computer program product for facilitating desktop-to-cloud application migration is provided. In various embodiments, the computer program product can comprise a non-transitory computer-readable memory having program instructions embodied therewith. In various aspects, the program instructions can be executable by a processor to cause the processor to access a computer program. In various instances, the program instructions can be executable to cause the processor to identify, via code compilation or syntactic parsing facilitated by one or more first preprocessor directives, a tree hierarchy of the computer program. In various cases, the program instructions can be executable to cause the processor to deploy the computer program in a nested model-view-presenter software architecture that is derived, via code introspection and data type association facilitated by one or more second preprocessor directives, from the tree hierarchy.

DESCRIPTION OF THE DRAWINGS

Various embodiments will be readily understood by the following detailed description in conjunction with the accompanying figures. To facilitate this description, like reference numerals designate like structural elements. Embodiments are illustrated by way of example, not by way of limitation, in the figures. The figures are not necessarily drawn to scale.

FIGS. 8-10 illustrate flow diagrams of example, non-limiting computer-implemented methods that facilitate desktop-to-cloud application migration in accordance with one or more embodiments described herein.

DETAILED DESCRIPTION

Figure 1:
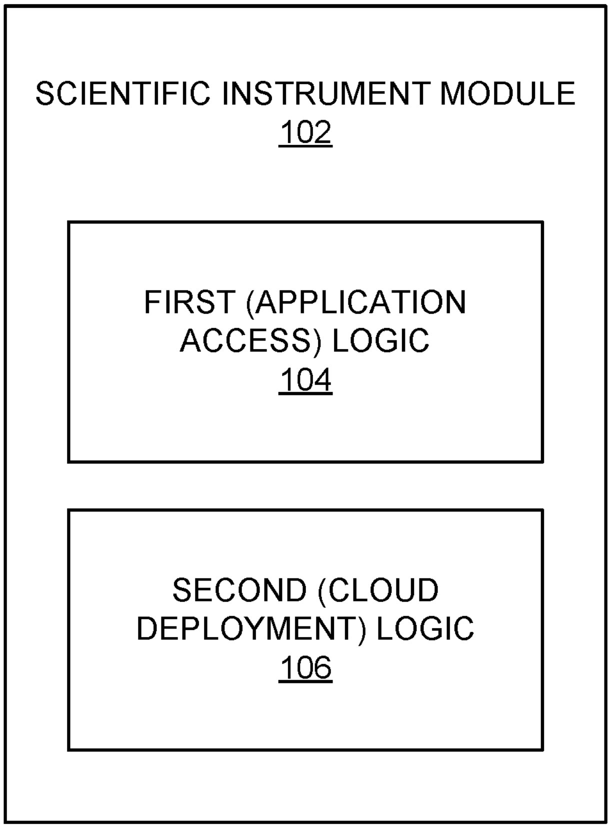
FIG. 1 illustrates an example, non-limiting block diagram of a scientific instrument module in accordance with various embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiments. Various additional operations can be performed, or described operations can be omitted in additional embodiments.

Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

A scientific instrument (e.g., mass spectrometer, electron microscope) can be any suitable computerized device that can capture or generate electronic measurements in a scientific, laboratory, research, or clinical operational context (e.g., that can capture or generate spectroscopic images or composition spectra). To facilitate the capture or generation of such electronic measurements, scientific instruments can leverage complex arrangements of actuatable parts (e.g., ion sources, ion lenses, heaters, coolers, fluid valves, fluid pumps, circuit switches, specimen stages, apertures), sensors (e.g., ion detectors, voltmeters, thermistors, potentiometers, pressure gauges), or consumables (e.g., carrier fluids, calibrants, filters).

Scientific instruments are often associated with computer programs. For example, elaborate computer programs can be created to facilitate the operation of scientific instruments or their constituent parts, sensors, or consumables, or to otherwise analyze or post-process the electronic measurements captured or generated by scientific instruments. Oftentimes, such computer programs take the form of legacy desktop applications (e.g., potentially outdated, yet still-in-use, computer programs that are coded or configured for local or on-premises deployment).

For various reasons, it can be desired to migrate such legacy desktop applications to a cloud computing environment. Indeed, cloud deployments can be considered as offering greater flexibility or scalability than local or desktop deployments. For example, without being migrated to a cloud environment, a legacy desktop application can be accessed or utilized only in an on-premises manner. But after being migrated to a cloud environment, the legacy desktop application can instead be accessed or utilized even in off-premises situations. As another example, suppose that there are multiple separate premises at which it is desired to implement a legacy desktop application. In such case, without being migrated to a cloud environment, an identical instantiation or version of the legacy desktop application would have to be separately or independently deployed at each of those multiple premises. In such case, it can become difficult or otherwise effort intensive to make sure that all of those identical instantiations or versions of the legacy desktop application are kept consistent with each other (e.g., if an edit or change is made to any one of those instantiations or versions, that same edit or change must subsequently be made to the rest of those instantiations or version to maintain consistency). In contrast, after being migrated to a cloud environment, a single, centralized instantiation or version of the legacy desktop application can be maintained in the cloud environment, and that single, centralized instantiation or version can be accessed from any of the multiple separate premises. Accordingly, concerns regarding instantiation or version consistency can be reduced (e.g., if an edit or change is made to that single, centralized instantiation or version, that edit or change can be considered as being automatically propagated to all of the multiple separate premises without having to be subsequently performed multiple times).

Unfortunately, as the inventors of various embodiments described herein recognized, existing techniques for migrating legacy desktop applications to cloud computing environments suffer from various disadvantages.

In particular, the present inventors recognized that existing techniques suffer from degraded performance due to electronic communication latencies. In particular, when migrated to a cloud computing environment, a legacy desktop application can be hosted on a server device of the cloud computing environment and can be remotely accessed by a client device of the cloud computing environment. As the present inventors realized, existing techniques require the client device to electronically communicate with the server device every time that a user of the client device desires to interact with the legacy desktop application. That is, each time that the user desires to do anything with respect to the legacy desktop application, the user provides input to the client device, the client device requests a response to such input from the server device, and the server device provides such response back to the client device. Depending upon network connectivity strength or fidelity between the client device and the server device, each round of such back-and-forth electronic communication can consume on the order of seconds to complete, and a distinct round of such back-and-forth communication can be required every single time that the user desires to interact in any way with respect to the legacy desktop application. In other words, the total communication time between the client device and the server device can easily excessively accumulate, which can be undesirable and which can negatively affect the user's cloud computing experience.

Additionally, the present inventors also recognized that existing techniques suffer from software development difficulties. In the fields of cloud computing and information technology, client-side or frontend software development is often considered as wholly separate or distinct from server-side or backend software development. Indeed, server-side or backend software development is usually focused on writing or debugging the underlying, substantive code for any given desktop application (e.g., coding the underlying algorithms, machine learning models, or functionalities that the given desktop application will be primarily responsible for performing). In contrast, client-side or frontend software development is instead usually focused on writing or debugging non-substantive interfacing code for the given desktop application (e.g., coding the graphical user interface tools that will be visually presented to the user of the client device and that will enable the user to selectively interact with or invoke the underlying algorithms, machine learning models, or functionalities of the given desktop application). Such different sides of software development are often facilitated using different coding languages (e.g., C++ in the backend; hypertext markup language (HTML) in the frontend) or different communication protocols (e.g., sockets, hypertext transfer protocol (HTTP) requests). Accordingly, a software developer or engineer who is creating or editing a desktop application in the backend can lack knowledge, experience, or expertise regarding the frontend. That software developer or engineer can thus spend precious time or effort trying to compensate for such lack of frontend knowledge, experience, or expertise, which can slow down, distract, or otherwise negatively affect their writing or debugging of the desktop application.

Accordingly, systems or techniques that can ameliorate one or more of these technical problems can be desirable.

Various embodiments described herein can address one or more of these technical problems. One or more embodiments described herein can include systems, computer-implemented methods, apparatus, or computer program products that can facilitate improved desktop-to-cloud application migration. In particular, various embodiments described herein can involve deploying or migrating a desktop application to a cloud computing environment, by automatically generating a nested model-view-presenter (MVP) software architecture based on the desktop application. Recall that an MVP architecture can be considered as comprising a data model, a view, and a presenter, where the data model can be whatever portion of code handles underlying or substantive computations, where the view can be whatever portion of code receives inputs from and renders outputs to a human user (e.g., via a graphical user interface), and where the presenter can be a portion of code that acts as an intermediary between the view and the data model (e.g., the presenter can determine how to update or adjust the data model based on user-input received by the view, and the presenter can determine how the view should format or render outputs that are computed by the data model). As described herein, the nested MVP software architecture can comprise an outer MVP and an inner MVP. In various instances, the outer MVP can comprise an outer view and an outer presenter, and the desktop application can be considered or otherwise treated as the data model of the outer MVP. Furthermore, the inner MVP can comprise an inner view and an inner presenter, and a lite or pruned version of the desktop application can be considered or otherwise treated as the data model of the inner MVP. Further still, the inner MVP can be considered as being equivalent to or otherwise as being contained within the outer view of the outer MVP. In various aspects, the desktop application and a portion of the outer presenter can be hosted on or by a server device of the cloud computing environment, whereas the remainder of the outer presenter and the outer view can instead be hosted on or by a client device of the cloud computing environment. As described herein, when given the desktop application, the nested MVP software architecture can be automatically generated, by performing, via preprocessor directives, various operations such as code compilation, syntactic parsing, code introspection, or data type matching/association on the desktop application. In particular, there can be repositories of prewritten lines or modules of code that respectively perform various universal presentation or viewing functionalities or sub-functionalities; and the outer presenter, the inner view, the inner presenter, and the lite or pruned version of the desktop application can each be automatically built by selecting whichever of those prewritten lines or modules of code correspond or match the data types of portions of code that are read, parsed, or introspected in the desktop application.

In various instances, this type of nested software architecture can overcome or otherwise reduce various disadvantages or problems encountered by existing techniques.

Indeed, as mentioned above, existing techniques can suffer from excessive communication latency, since they require a client-to-server-back-to-client round of electronic communication each time that a user desires to interact in any way with the desktop application. In stark contrast, the nested MVP architecture described herein can avoid or reduce such excessive communication latency. In particular, whenever the user desires to interact in some way with the desktop application, it can be determined whether or not such interaction is able to be sufficiently handled or otherwise facilitated by the lite version of the desktop application. If so, then the inner MVP can be invoked to respond to the user. If not, then the outer MVP can be invoked to respond to the user. Because the inner MVP can be hosted entirely on the client device, situations in which the inner MVP is invoked to respond to the user can lack client-server communications. In this way, the nested MVP architecture can be considered as reducing the total number of client-to-server-back-to-client rounds of electronic communication (e.g., such communication rounds can be used only when the full or entire desktop application is needed to handle the user's interaction; such communication rounds can be eliminated or avoided when the lite or pruned version of the desktop application is sufficient to handle the user's interaction).

Moreover, as mentioned above, existing techniques can introduce software development difficulties. Indeed, a backend or server-side engineer or technician can be responsible for writing or debugging the desktop application. But, when existing techniques are implemented, that backend or server-side engineer or technician can waste valuable time trying to familiarize themself with frontend or client-side syntax or protocols. In stark contrast, when various embodiments described herein are implemented, various automatic operations such as code compilation, syntactic parsing, code introspection, and data type matching or association can be leveraged to automatically generate the views and presenters of the nested MVP software architecture. Accordingly, the backend or server-side engineer or technician can focus on properly writing or debugging the desktop application and need not waste any time trying to learn how to code client-side user interface elements (e.g., the scripts of the views and presenters of the nested MVP software architecture can be auto-populated with whichever prewritten universal lines or modules of code match the data types introspected from the desktop application, and so the backend or server-side engineer or technician need not spend any time trying to learn client-side syntax or protocols).

Accordingly, various embodiments described herein can be considered as facilitating improved desktop-to-cloud application migration.

Various embodiments described herein can be considered as a computerized tool (e.g., any suitable combination of computer-executable hardware or computer-executable software) that can facilitate improved desktop-to-cloud application migration. In various aspects, such computerized tool can comprise an access component or a cloud component.

In various embodiments, there can be a scientific instrument. In various aspects, the scientific instrument can be any suitable computerized device that can electronically capture, measure, or otherwise record any suitable electronic information that carries clinical or laboratory significance (e.g., can be a mass spectrometer, can be an electron microscope). In any case, there can be a desktop application that is associated with the scientific instrument. In various instances, the desktop application can be any suitable computer program that is written in any suitable coding syntax or coding language and that pertains in some substantive way to the scientific instrument (e.g., can contain any suitable algorithms for analyzing or otherwise manipulating whatever electronic information is measured by the scientific instrument; can contain any suitable algorithms for modeling or otherwise forecasting the behavior or performance of the scientific instrument). In some cases, the desktop application can be considered as a legacy application (e.g., as being outdated or aged but nevertheless still in use).

In various aspects, there can be a cloud computing environment. In various instances, the cloud computing environment can comprise a server device and a client device that are physically remote from each other but that can electronically communicate with each other (e.g., via Internet or otherwise wireless network connections). In various cases, the client device can be any suitable computing device (e.g., desktop computer, laptop computer, smart phone) that can be operated by a user. In various aspects, the server device can be any suitable computing device that can provide any suitable computational or computing service for or otherwise on behalf of the client device.

In various instances, it can be desired to deploy the desktop application on, or otherwise migrate the desktop application to, the cloud computing environment. Such deployment or migration can be accomplished by the computerized tool described herein.

In various embodiments, the access component of the computerized tool can electronically access the desktop application. For instance, the access component can receive, retrieve, or otherwise obtain the desktop application from any suitable centralized or decentralized data structure (e.g., graph data structure, relational data structure, hybrid data structure), such that the access component can be considered a conduit through which other components of the computerized tool can electronically interact with (e.g., read, write, edit, copy, manipulate) the desktop application. Moreover, in various aspects, the access component can electronically access the cloud computing environment. For instance, the access component can communicate with (e.g., transmit data to or from) the server device or the client device, such that the access component can be considered a conduit through which other components of the computerized tool can electronically interact with (e.g., command, activate, deactivate, influence, alter) the cloud computing environment.

In various embodiments, the cloud component of the computerized tool can electronically migrate the desktop application to the cloud computing environment, via generation of a nested MVP architecture. In other words, the cloud component can electronically create the nested MVP architecture based on the desktop application, and the cloud component can electronically deploy the desktop application on the cloud computing environment according to or otherwise by using the nested MVP architecture.

In various aspects, the nested MVP architecture can comprise an outer MVP architecture and an inner MVP architecture. In various instances, the outer MVP architecture can, as its name suggests, comprise an outer data model, an outer presenter, and an outer view. Likewise, the inner MVP architecture can, as its name suggests, comprise an inner data model, an inner presenter, and an inner view. In various cases, the outer view can be considered as equivalent to or otherwise containing the inner MVP architecture. Accordingly, the inner MVP architecture can be considered as being inside of or within the outer MVP architecture, hence the terms "inner," "outer," and "nested."

In various aspects, the outer data model can be the desktop application itself. In contrast, the inner data model can be a lite, pruned, or otherwise compressed version of the desktop application. In various instances, the inner data model can include or contain metadata regarding the desktop application (e.g., can indicate or specify how many or what types of underlying algorithms the desktop application possesses). In various cases, the inner data model can exclude or lack underlying algorithms of the desktop application but can nevertheless be able to hold, store, maintain, explore, or post-process whatever resultant data is produced or outputted by those underlying algorithms (e.g., can post-process such resultant data with Fourier transforms, with trendline computations, or with hypothesis testing). In various aspects, the inner data model can include compact, compressed, or simpler versions of the underlying algorithms of the desktop application, such that the inner data model can compute resultant data more quickly but less accurately than the desktop application itself.

In various instances, the inner view can be any suitable script or lines of computer code that can facilitate: receipt of inputs or selections supplied by a user; and visual or audible rendition or display of whatever data is produced or supplied by the inner data model. In various cases, the inner presenter can be any suitable script or lines of computer code that can functionally mediate between the inner view and the inner data model. As a non-limiting example, the inner view can forward user-supplied inputs to the inner presenter; the inner presenter can fetch from the inner data model resultant data that is responsive to those user-supplied inputs; and the inner presenter can instruct the inner view to render or display that resultant data in any suitable format.

In various aspects, the outer view, as mentioned above, can be considered as being equivalent to the inner MVP architecture (e.g., to the totality of the inner view, the inner presenter, and the inner data model). In various instances, the outer presenter can be any suitable script or lines of computer code that can functionally mediate between the outer view (e.g., the inner MVP architecture) and the desktop application. As a non-limiting example, the outer view (e.g., the inner MVP architecture) can, in some cases as described herein, forward user-supplied inputs (e.g., received by the inner view) to the outer presenter; the outer presenter can fetch from the desktop application itself resultant data that is responsive to those user-supplied inputs; and the outer presenter can provide that resultant data back to the outer view (e.g., back to the inner MVP architecture, so as to ultimately be rendered or displayed by the inner view).

More specifically, the inner presenter can, in various aspects, include one or more lines of code which determine whether or not the inner data model can sufficiently or adequately handle or respond to whatever user-supplied inputs or selections are received by the inner view.

As a non-limiting example, suppose that the inner data model lacks the underlying algorithms of the desktop application, such that the inner data model can store or explore resultant data produced by the desktop application but cannot compute or generate such resultant data on its own. In such case, the inner presenter can determine whether the user-supplied inputs or selections request the computation or generation of new resultant data that is not yet stored in the inner data model or instead request the exploration of resultant data that is already stored in the inner data model. If the user-supplied inputs or selections request the computation or generation of new resultant data that is not yet stored in the inner data model, then the inner presenter can conclude that the inner data model cannot sufficiently or adequately handle or respond to those user-supplied inputs or selections. In contrast, if the user-supplied inputs or selections request the exploration or manipulation of resultant data that is already stored in the inner data model, then the inner presenter can instead conclude that the inner data model can sufficiently or adequately handle or respond to those user-supplied inputs or selections.

As another non-limiting example, suppose that the inner data model contains simpler or compressed versions of the underlying algorithms of the desktop application, such that the inner data model can compute or generate resultant data more quickly but less accurately than the desktop application. In such case, the inner presenter can determine whether the user-supplied inputs or selections request the computation or generation of resultant data using more than a threshold level of accuracy or instead request the computation or generation of resultant data using less than the threshold level of accuracy. If the user-supplied inputs or selections request the computation or generation of resultant data using more than the threshold level of accuracy, then the inner presenter can conclude that the inner data model cannot sufficiently or adequately handle or respond to those user-supplied inputs or selections. In contrast, if the user-supplied inputs or selections request the computation or generation of resultant data using less than the threshold level of accuracy, then the inner presenter can instead conclude that the inner data model can sufficiently or adequately handle or respond to those user-supplied inputs or selections.

In any case, if the inner presenter concludes or determines that user-supplied inputs or selections can be sufficiently or adequately handled by the inner data model, the inner presenter can accordingly fetch whatever data from the inner data model is responsive to those user-supplied inputs or selections. On the other hand, if the inner presenter concludes or determines that user-supplied inputs or selections cannot be sufficiently or adequately handled by the inner data model, the inner presenter can accordingly forward those user-supplied inputs or selections to the outer presenter, and the outer presenter can accordingly fetch whatever data from the desktop application is responsive to those user-supplied inputs or selections In various aspects, the cloud component can distribute or allocate the nested MVP architecture on the cloud computing environment as follows. In various instances, the desktop application can be hosted or otherwise executed on the server device. In contrast, the outer view (e.g., the inner MVP architecture) can instead be hosted or otherwise executed on the client device. In various cases, the client device can compile the outer view (e.g., the inner MVP architecture) using WebAssembly or any other suitable compilation platform. In some aspects, the outer presenter can be hosted or otherwise executed on the server device. However, in other aspects, the outer presenter can instead be split into two separate portions (e.g., two distinct but related scripts), one of which can be hosted or executed on the server device and the other of which can be hosted or executed on the client device. In such cases, those two separate portions can be considered as encapsulating whatever communication or network protocols allow or enable electronic communication between the client device and the server device, so as to synchronize client-to-server or server-to-client data transmission.

In various aspects, distributing or allocating the nested MVP architecture on the cloud computing environment as described herein can reduce accumulation of client-server communication latency as compared to existing techniques.

Indeed, suppose that a user of the client device desires to interact in some way with the desktop application. Accordingly, the user can provide (e.g., via any suitable human-to-computer interface of the client device, such as a keyboard, keypad, or touchscreen) a given input to the inner view. In various aspects, the inner view can forward that given input to the inner presenter. Because the inner presenter and the inner view can both be hosted by the client device, such forwarding can involve no data transmission between the client device and the server device. In various instances, the inner presenter can determine whether or not the inner data model (e.g., the lite version of the desktop application) is able to handle or respond to the given input.

Suppose that the inner presenter concludes that the inner data model can handle or respond to the given input (e.g., that the given input requests exploration or manipulation of resultant data that is already stored in the inner data model; or that the given input requests computation or generation of resultant data according to an accuracy level that the inner data model can meet). In such case, the inner presenter can fetch from the inner data model whatever resultant data is responsive to or otherwise requested by the given input (e.g., if the given input requests identification, exploration, or manipulation of existing data that is already stored in the inner data model, then the inner presenter can instruct or command the inner data model to identify, explore, or manipulate such existing data as requested, the inner data model can do so, and the inner data model can return to the inner presenter whatever results ensue; if the given input requests computation of new data that can be provided by the inner data model, then the inner presenter can instruct or command the inner data model to compute such new data as requested, the inner data model can do so, and the inner data model can return to the inner presenter whatever results ensue). In various aspects, the inner presenter can then determine how that resultant data should be visually or audibly formatted, and the inner presenter can instruct or command the inner view to render, play, or display that resultant data according to the determined visual or audible format. Note that, because the inner view, the inner presenter, and the inner data model can all be hosted on the client device, such situations can involve no data transmission between the client device and the server device.

Now, suppose instead that the inner presenter concludes that the inner data model cannot handle or respond to the given input (e.g., that the given input requests computation of resultant data above a threshold accuracy level, where the resultant data is not already stored in the inner data model, and where the inner data model cannot meet the threshold accuracy level). In such case, the inner presenter can forward the given input to the outer presenter. Because the inner presenter can be hosted on the client device, and because at least some portion of the outer presenter can be hosted on the server device, such forwarding can involve data transmission between the client device and the server device. In various aspects, the outer presenter can fetch from the desktop application whatever resultant data is responsive to or otherwise requested by the given input (e.g., the outer presenter can instruct or command the desktop application to compute whatever data is requested by the given input, the desktop application can do so, and the desktop application can return to the outer presenter whatever results ensue). In various aspects, the outer presenter can forward the resultant data to the inner presenter. In various instances, the inner presenter can then determine how that resultant data should be visually or audibly formatted, and the inner presenter can instruct or command the inner view to render, play, or display that resultant data according to the determined visual or audible format. In some cases, the inner presenter can also transmit that resultant data to the inner data model for storage or future exploration.

Accordingly, as described herein, the nested MVP architecture can be considered as involving client-server communication only when the inner data model is unable to sufficiently or adequately handle or respond to the given input supplied by the user. Thus, when the nested MVP architecture is implemented, the total number of client-to-server-back-to-client communication rounds can be reduced as compared to existing techniques. In other words, implementation of the nested MVP architecture can ameliorate the problem of excessive communication latency suffered by existing techniques.

In various embodiments, the cloud component of the computerized tool can electronically generate or create the nested MVP architecture, by leveraging various automated operations such as code compilation, syntactic parsing, code introspection, or data type matching, any of which can be driven by preprocessor directives.

In particular, the cloud component can execute one or more first preprocessor directives, where those one or more first preprocessor directives can cause the cloud component to perform code compilation or syntactic parsing on the desktop application. In various aspects, such compilation or parsing can yield a tree hierarchy that represents or indicates the hierarchical structure of the desktop application. More specifically, the tree hierarchy can be a directed graph, whose nodes (e.g., root nodes, composite nodes, leaf nodes) represent functionally distinct blocks, snippets, modules, or lines of code within the desktop application (e.g., a distinct block, snippet, module, or line of code can define a particular variable or parameter used by the desktop application, can define a particular algorithm used by the desktop application, can define a particular loop or portion of an algorithm of the desktop application), and whose edges represent which of those distinct blocks, snippets, modules, or lines of code contain, and thus depend upon, which others of those distinct blocks, snippets, or modules of code. In some cases, the tree hierarchy can be considered as indicating the organization and contents of a total or overall script of the desktop application (e.g., as indicating where each distinct block, snippet, module, or line of code is located in the script of the desktop application; what each distinct block, snippet, module, or line of code in the script of the desktop application does; and which distinct blocks, snippets, modules, or lines of code in the script of the desktop application depend upon each other).

In various aspects, the cloud component can store, maintain, or otherwise access a plurality of code repositories that respectively correspond to the different components of the nested MVP architecture, where each of those code repositories can contain universal, prewritten presentation or viewing logics that are collated by data type. In various instances, the cloud component can auto-populate the scripts of the various components of the nested MVP architecture, by introspecting the data types of the distinct blocks, snippets, modules, or lines of code indicated in the tree hierarchy and by identifying whichever universal, prewritten presentation or viewing logics in the code repositories correspond to data types that match those of the tree hierarchy. In various cases, such auto-population can yield the nested MVP architecture.

As a non-limiting example, the plurality of code repositories can include an inner view code repository. The inner view code repository can be considered as a list, set, or collection of prewritten code logics that perform universal view-related functionalities. In various cases, that list, set, or collection of prewritten code logics can be collated by data type. That is, each prewritten code logic in the inner view code repository can be considered as being mapped or otherwise linked to a respective data type. In various aspects, the cloud component can perform code introspection on the tree hierarchy of the desktop application, and such introspection can reveal the respective data type of each node of the tree hierarchy. Accordingly, for each given node in the tree hierarchy, the cloud component can identify a prewritten code logic in the inner view code repository that is mapped or linked to whatever data type that the given node exhibits. In some instances, more than one prewritten code logic in the inner view repository can be mapped or linked to the data type of the given node. In such case, any one of those more than one prewritten code logics can be selected randomly or otherwise according to any suitable order of priority. In any case, the cloud component can identify a respective prewritten code logic from the inner view code repository for each node in the tree hierarchy. Such identified prewritten code logics can be considered as collectively forming their own hierarchical structure, which can be considered as the hierarchical structure of the script of the inner view. In this way, the cloud component can automatically construct the inner view, by leveraging code introspection and data type matching/association with respect to the inner view code repository.

As another non-limiting example, the plurality of code repositories can include an inner presenter code repository. Similar to above, the inner presenter code repository can be considered as a list, set, or collection of prewritten code logics that perform universal presenter-related functionalities, and that list, set, or collection of prewritten code logics can be collated by data type. Just as above, for each given node in the tree hierarchy, the cloud component can identify (via introspection) a data type of the given node, and the cloud component can identify a prewritten code logic in the inner presenter code repository that is mapped or linked to that data type. Such identified prewritten code logics can be considered as collectively forming their own hierarchical structure, which can be considered as the hierarchical structure of the script of the inner presenter. In this way, the cloud component can automatically construct the inner presenter, by leveraging code introspection and data type matching/association with respect to the inner presenter code repository.

As still another non-limiting example, the plurality of code repositories can include an outer presenter code repository. Just as above, the outer presenter code repository can be considered as a list, set, or collection of prewritten code logics that perform universal presenter-related functionalities, and that list, set, or collection of prewritten code logics can be collated by data type. Just as above, for each given node in the tree hierarchy, the cloud component can identify (via introspection) a data type of the given node, and the cloud component can identify a prewritten code logic in the outer presenter code repository that is mapped or linked to that data type. Such identified prewritten code logics can be considered as collectively forming their own hierarchical structure, which can be considered as the hierarchical structure of the script of the outer presenter. In this way, the cloud component can automatically construct the outer presenter, by leveraging code introspection and data type matching/association with respect to the outer presenter code repository.

As even another non-limiting example, the plurality of code repositories can include a lite code repository. Similar to above, the lite code repository can be considered as a list, set, or collection of prewritten code logics that perform whatever universal functionalities are deemed to be associated with lite versions of desktop applications, and that list, set, or collection of prewritten code logics can be collated by data type. Just as above, for each given node in the tree hierarchy, the cloud component can identify (via introspection) a data type of the given node, and the cloud component can identify a prewritten code logic in the lite code repository that is mapped or linked to that data type. Such identified prewritten code logics can be considered as collectively forming their own hierarchical structure, which can be considered as the hierarchical structure of the script of the lite version of the desktop application. In this way, the cloud component can automatically construct the lite version of the desktop application, by leveraging code introspection and data type matching/association with respect to the lite code repository. However, this is a mere non-limiting example. In other embodiments, there can be no lite code repository. Instead, the hierarchical structure of the lite version of the desktop application can be a trimmed-down or sparse version of the tree hierarchy of the desktop application. Indeed, the cloud component can iterate through each node in the tree hierarchy and can decide whether or not to keep that node in the lite version of the desktop application. In various cases, the desktop application can decide to delete any nodes whose introspected data types pertain to substantive, underlying algorithms of the desktop application.

In any case, the cloud component can auto-populate the coding scripts of the inner view, of the inner presenter, of the outer presenter, and of the lite version of the desktop application. Once such coding scripts are generated via auto-population, the cloud component can distribute them in the cloud computing environment as described above. That is, the cloud component can transmit the completed coding scripts of the inner view, of the inner presenter, and of the inner data model (e.g., the lite version of the desktop application) to the client device for hosting, and the cloud component can transmit the completed coding script of the outer presenter, as well as the script of the desktop application, to the server device for hosting. Thus, by leveraging code compilation, syntactic parsing, code introspection, and data type matching, the nested MVP architecture can be automatically created and deployed in the cloud computing environment. Accordingly, backend or server-side engineers or technicians can focus on writing or debugging the desktop application without being distracted by frontend or client-side concerns, unlike with existing techniques.

Various embodiments described herein can be employed to use hardware or software to solve problems that are highly technical in nature (e.g., to facilitate improved desktop-to-cloud application migration), that are not abstract and that cannot be performed as a set of mental acts by a human. Further, some of the processes performed can be performed by a specialized computer (e.g., client devices, server devices, preprocessor directives) for carrying out defined acts related to cloud computing.

For example, such defined acts can include: accessing, by a device operatively coupled to a processor, a desktop application; and deploying, by the device, the desktop application in a cloud computing environment, based on generating a nested model-view-presenter software architecture that treats the desktop application as an outer data model. In various aspects, the device can generate the nested model-view-presenter software architecture by: identifying, by the device and via code compilation or syntactic parsing facilitated by one or more first preprocessor directives, a tree hierarchy of the desktop application; and synthesizing, by the device and via code introspection and data type association facilitated by one or more second preprocessor directives, corresponding portions of the nested model-view-presenter software architecture based on the tree hierarchy. In various instances, the cloud computing environment can include a server device and a client device, wherein the server device can host the desktop application and a portion of an outer presenter, and wherein the client device can host another portion of the outer presenter and an outer view. In various cases, the outer view can include an inner view, an inner presenter, and a lite version of the desktop application.

Such defined acts are inherently computerized. Indeed, desktop applications, MVP architectures, and cloud environments are intrinsically computerized, hardware-based, or software-based constructs that cannot be implemented in any meaningful, reasonable, practicable, or rational way by the human mind or by a human with pen and paper. Furthermore, the very performance of migrating or deploying computer programs onto a cloud environment is an inherently computerized action that cannot be implemented in any way whatsoever without computers. It would not make any sense at all to discuss cloud computing deployment or cloud computing migration without reference to computers.

Moreover, various embodiments described herein can integrate into a practical application various teachings relating to improved desktop-to-cloud application migration. As explained above, the present inventors realized that, when existing techniques are implemented to migrate a given desktop application to the cloud, such existing techniques require a full client-to-server-back-to-client round of communication every time that a user desires to interact in any way with the desktop application. This can unfortunately cause excessive accumulation of communication latency. Also as explained above, the present inventors realized that, when existing techniques are implemented to migrate a given desktop application to the cloud, backend engineers often become distracted by trying to address or compensate for frontend concerns with which they have little or no experience (e.g., client devices often utilize different coding syntaxes or network protocols than server devices). This can unfortunately waste valuable time and effort of such backend engineers. For at least these reasons, existing techniques can be considered as suffering from various technical problems.

Various embodiments described herein can help to ameliorate one or more of such technical problems. In particular, various embodiments described herein can involve deploying a given desktop application on a cloud computing environment, via a nested MVP architecture. As described herein, the nested MVP architecture can be automatically generated by performing various operations such as code compilation, syntactic parsing, code introspection, or data type matching on the given desktop application. Also as described herein, the nested MVP architecture can include an outer MVP and an inner MVP. In various aspects, the outer MVP can be made up of the desktop application itself, an outer presenter, and an outer view. In various instances, the outer view can be or contain the inner MVP, which can be made up of an inner view, an inner presenter, and a lite version of the desktop application. In various cases, the desktop application and at least some portion of the outer presenter can be hosted on a server device of the cloud computing environment. In contrast, the outer view (and potentially a remainder of the outer presenter) can be hosted on a client device of the cloud computing environment. Accordingly, a user of the client device can provide inputs or selections to the inner view, the inner view can forward those inputs or selections to the inner presenter, and the inner present can determine whether or not the lite version of the desktop application is capable of satisfactorily handling or responding to those inputs or selections. If so, the inner presenter can fetch responsive data from the lite version of the desktop application and can instruct the inner view to display or render that responsive data to the user. If not, the inner presenter can instead forward those inputs or selections to the outer presenter. Accordingly, the outer presenter can fetch responsive data from the desktop application and can pass that responsive data back to the inner presenter, which, as above, can instruct the inner view to display or render that responsive data to the user. In this way, a client-to-server-back-to-client communication round can be conducted only when the lite version of the desktop application is unable to handle or respond to user-supplied inputs or selections, rather than being performed each time that the user provides such inputs or selections. Thus, various embodiments described herein can reduce communication latency as compared to existing techniques. Additionally, because the nested MVP architecture can be automatically generated (e.g., via compilation, parsing, introspection, or data type matching), backend engineers need not waste any time or effort worrying about client-side concerns (e.g., client-side syntax, client-side network protocols) for which they lack experience or expertise. For at least these reasons, various embodiments described herein can be considered as a concrete and tangible technical improvement in the field of cloud computing. Accordingly, various embodiments described herein certainly qualify as useful and practical applications of computers.

FIG. 1 illustrates an example, non-limiting block diagram of a scientific instrument module 102 in accordance with various embodiments described herein.

In various embodiments, the scientific instrument module 102 can be implemented by circuitry (e.g., including electrical or optical components), such as a programmed computing device. Logic of the scientific instrument module 102 can be included in a single computing device or can be distributed across multiple computing devices that are in communication with each other as appropriate. Examples of computing devices that may, singly or in combination, implement the scientific instrument module 102 are discussed herein with reference to FIGS. 17 and 19, and examples of systems or networks of interconnected computing devices, in which the scientific instrument module 102 may be implemented across one or more of the computing devices, are discussed herein with reference to FIGS. 18 and 20.

The scientific instrument module 102 can include first logic 104 and second logic 106. As used herein, the term "logic" can include an apparatus that is to perform a set of operations associated with the logic. For example, any of the logic elements included in the scientific instrument module 102 can be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" can refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module can omit one or more of the logic elements depicted in the associated drawings; for example, a module may include a subset of the logic elements depicted in the associated drawings when that module is to perform a subset of the operations discussed herein with reference to that module.

In various embodiments, there can be a scientific instrument corresponding to the scientific instrument module 102. In various aspects, the scientific instrument can be any suitable computerized device that can electronically measure some scientifically-relevant, clinically-relevant, or research-relevant characteristic, property, or attribute of an analytical specimen (e.g., of a known or unknown mixture, compound, or collection of matter). As a non-limiting example, a scientific instrument can be a mass spectrometer that is operatively coupled to a gas chromatograph or a liquid chromatograph. In such case, the scientific instrument can measure or determine ion spectra (e.g., relative ion abundance as a function of mass-to-charge ratio) of the analytical specimen. As another non-limiting example, a scientific instrument can be a scanning electron microscope. In such case, the scientific instrument can measure or determine a surface topography of the analytical specimen. As yet another non-limiting example, a scientific instrument can be a transmission electron microscope. In such case, the scientific instrument can measure or determine internal structural details of the analytical specimen. As a more general non-limiting example, a scientific instrument can be any suitable type of charged-particle microscope (e.g., some types of microscopes can use beams of non-electron ions to capture images).

In various embodiments, the first logic 104 can access a desktop application that is associated with the scientific instrument. In various aspects, the desktop application can be any suitable computer program that substantively relates in any suitable fashion to the scientific instrument. As a non-limiting example, the desktop application can, in some cases, be configured or designed to analyze or otherwise process measurements that are captured by the scientific instrument. As another non-limiting example, the desktop application can, in some cases, be configured or designed to predict or forecast behavior, performance, or degradation of the scientific instrument.

In various embodiments, the second logic 106 can deploy the desktop application to a cloud computing environment, based on a nested MVP software architecture. In various aspects, the nested MVP software architecture can include an outer MVP and an inner MVP. In various instances, the outer MVP can comprise an outer view hosted on a client device of the cloud computing environment, an outer presenter hosted either on a server device of the cloud computing environment or on both the client device and the server device, and the desktop application itself hosted on the server device. In various cases, the inner MVP can be equivalent to or otherwise contained within the outer view. In various aspects, the inner MVP can comprise an inner view, an inner presenter, and a lite version of the desktop application. In various instances, a user of the client device can provide any suitable inputs to the inner view, and the inner view can forward those inputs to the inner presenter. In various cases, the inner presenter can determine whether or not the lite version of the desktop application is capable of properly handling or responding to those inputs. If so, the inner presenter can instruct the lite version of the desktop application to produce outputs that are responsive to the inputs supplied by the user, and the inner presenter can accordingly instruct the inner view to display such outputs to the user. If not, the inner presenter can instead pass the inputs supplied by the user to the outer presenter, the outer presenter can instruct the desktop application to produce outputs that are responsive to the inputs, and the outer presenter can pass those outputs to the inner present, which can accordingly instruct the inner view to display such outputs to the user In this way, such nested MVP software architecture can reduce or otherwise ameliorate accumulation of communication latency, by performing or conducting client-to-server-back-to-client communication rounds only for user-supplied inputs that the lite version of the desktop application cannot properly respond to.

Furthermore, in some aspects, the second logic 106 can involve automatically generating the nested MVP software architecture, by leveraging preprocessor directives. In particular, one or more first preprocessor directives can be executed, which can cause code compilation or syntactic parsing to be performed on the desktop application, thereby yielding a tree hierarchy representing the internal structure or organization of the desktop application. Then, one or more second preprocessor directives can be executed, which can cause scripts respectively corresponding to the inner view, the inner presenter, the lite version of the desktop application, and the outer presenter to be auto-populated with appropriate prewritten view-related or presentation-related logics that are mapped to whatever data types are introspected from the tree hierarchy.

Accordingly, the scientific instrument module 102 can facilitate improved desktop-to-cloud application migration.

Figure 2:
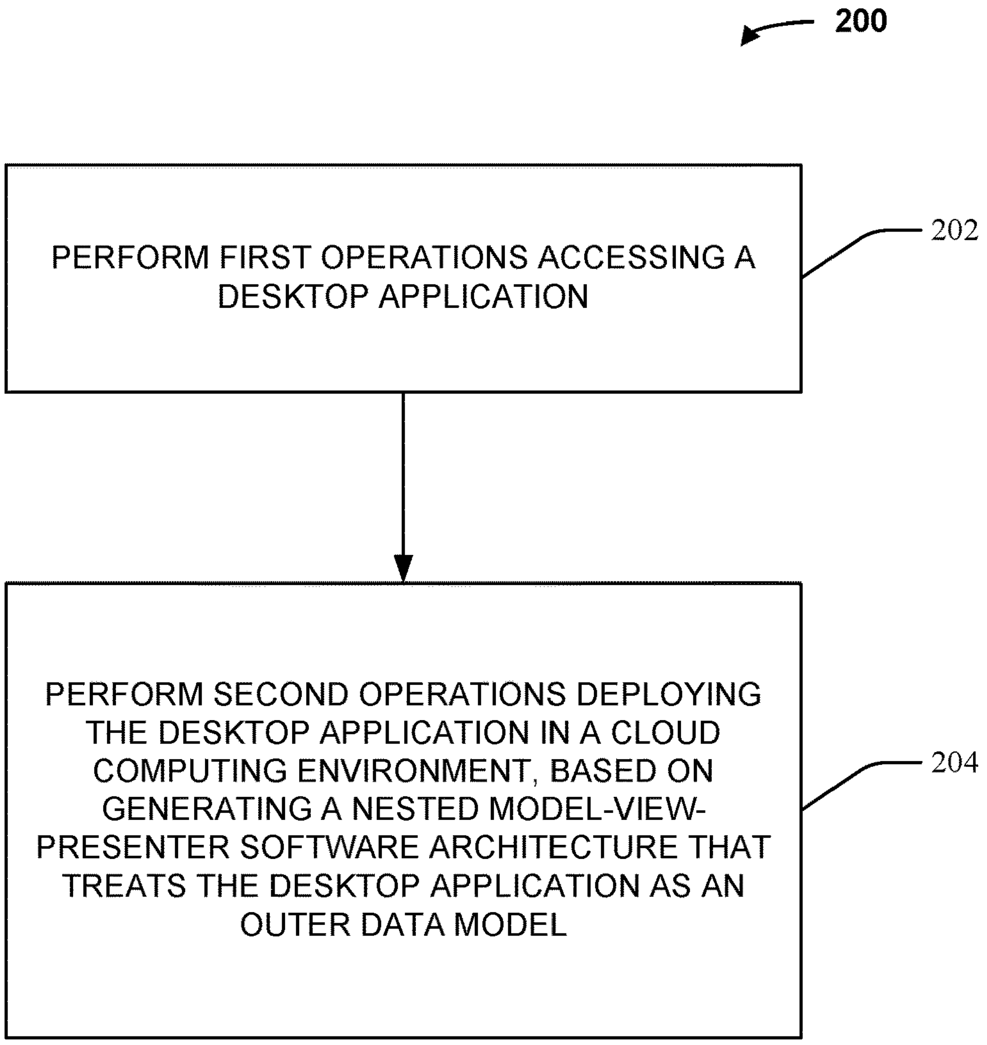
FIG. 2 illustrates an example, non-limiting flow diagram of a computer-implemented method in accordance with various embodiments described herein.

FIG. 2 is an example, non-limiting flow diagram of a computer-implemented method 200 in accordance with various embodiments described herein. The operations of the computer-implemented method 200 may be used in any suitable context to perform any suitable operations (e.g., can be performed by or used in conjunction with any of the various modules, computing devices, or graphical user interfaces described with respect to of FIGS. 1, 16, 17, 18, 19, and 20). Operations are illustrated once each and in a particular order in FIG. 2, but the operations may be reordered or repeated as desired and appropriate (e.g., different operations performed may be performed in parallel, as suitable).

In various aspects, act 202 can include performing first operations accessing a desktop application (e.g., which can correspond to or otherwise be associated with a scientific instrument). In various cases, the first logic 104 can perform or otherwise facilitate act 202.

In various instances, act 204 can include performing second operations deploying the desktop application in a cloud computing environment, based on generating a nested model-view-presenter software architecture that treats the desktop application as an outer data model. In various cases, the second logic 106 can perform or otherwise facilitate act 204.

Accordingly, the computer-implemented method 200 can facilitate improved desktop-to-cloud application migration.

Figure 3:
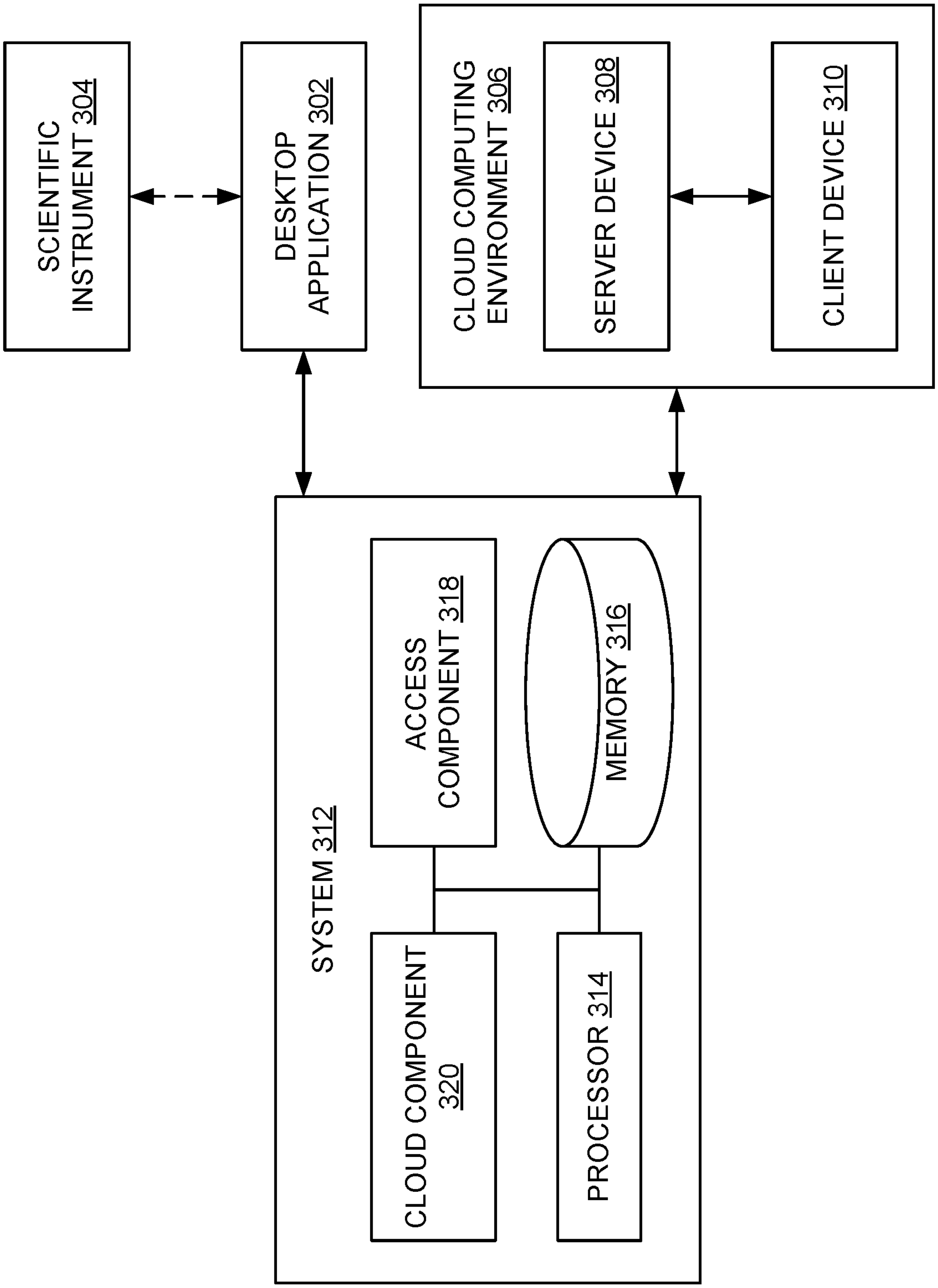
FIG. 3 illustrates a block diagram of an example, non-limiting system that facilitates desktop-to-cloud application migration in accordance with one or more embodiments described herein.

FIG. 3 illustrates a block diagram of an example, non-limiting system 312 that can facilitate desktop-to-cloud application migration in accordance with one or more embodiments described herein.

In various embodiments, there can be a scientific instrument 304. In various aspects, the scientific instrument 304 can be as described above. That is, the scientific instrument 304 can be any suitable computerized device that can electronically measure any suitable scientifically-relevant, clinically-relevant, or research-relevant characteristic, attribute, or property of any suitable analytical specimen. As a non-limiting example, the scientific instrument 304 can be a mass spectrometer which can be outfitted or equipped with a gas or liquid chromatograph. In such case, the scientific instrument 304 can leverage its constituent hardware (e.g., injector, oven-heated column, carrier fluid valves or pumps, ion beam emitter, ion optics lenses or shrouds, mass analyzer) to electronically determine the chemical composition or make-up of any given analytical specimen. As another non-limiting example, the scientific instrument 304 can be a scanning or transmission electron microscope. In such case, the scientific instrument 304 can leverage its constituent hardware (e.g., electron sources, anodes, condenser lenses, condenser apertures, scan coils, objective lenses, objective apertures, deflectors, condensers, stigmators, electron detectors, X-ray detectors, actuatable specimen stages) to electronically determine or map surface structures or internal structures of any given analytical specimen.

In various embodiments, there can be a desktop application 302. In various aspects, the desktop application 302 can be any suitable computer program that is written in any suitable coding syntax (e.g., C++) and that is associated with the scientific instrument 304 in any suitable way or fashion.

As a non-limiting example, the desktop application 302 can be a computer program that is configured or designed to process or otherwise analyze whatever electronic data (e.g., chemical composition spectra, spectroscopic images) are measured or recorded by the scientific instrument 304. For instance, the desktop application 302 can comprise or otherwise contain any suitable machine learning algorithms (e.g., deep learning neural networks, support vector machines, Bayesian belief networks, fuzzy logic models, data fusion engines, decision trees, random forest models, or any suitable combinations or ensembles thereof) that can be trained (e.g., in supervised fashion, in unsupervised fashion, in reinforcement learning fashion, in semi-supervised fashion) to perform classification on whatever electronic data is measured or recorded by the scientific instrument 304 (e.g., to generate classification labels indicating to which one of two or more defined classes a given piece of data measured by the scientific instrument 304 belongs). In another instance, the desktop application 302 can comprise or otherwise contain any suitable machine learning algorithms that can be trained to perform segmentation on whatever electronic data is measured or recorded by the scientific instrument 304 (e.g., to generate segmentation masks indicating to which one of two or more defined classes each respective portion of a given piece of data measured by the scientific instrument 304 belongs). As yet another instance, the desktop application 302 can comprise or otherwise contain any suitable machine learning algorithms that can be trained to perform any suitable regression task on whatever electronic data is measured or recorded by the scientific instrument 304 (e.g., to denoise, enhance the resolution of, or otherwise transform a given piece of data measured by the scientific instrument 304).

As another non-limiting example, the desktop application 302 can be a computer program that is configured or designed to predict, track, or otherwise forecast any suitable behavior or performance of the scientific instrument 304. For instance, the desktop application 302 can comprise or otherwise contain any suitable digital twin of the scientific instrument 304. In various aspects, such digital twin can be any suitable collection or set of any suitable mathematical or physics-based models that can collectively simulate, forecast, or otherwise predict any suitable behavioral detail or aspect of the scientific instrument 304. In some cases, the digital twin can comprise any suitable mass continuity equations, inequalities, or formulas that pertain in some way to the scientific instrument 304. In other cases, the digital twin can comprise any suitable energy balance equations, inequalities, or formulas that pertain in some way to the scientific instrument 304. In even other cases, the digital twin can comprise any suitable heat transfer equations, inequalities, or formulas that pertain in some way to the scientific instrument. In yet other cases, the digital twin can comprise any suitable fluid flow equations, inequalities, or formulas that pertain in some way to the scientific instrument 304. In still other cases, the digital twin can comprise any suitable kinetic or kinematic equations, inequalities, or formulas that pertain in some way to the scientific instrument 304. In other cases, the digital twin can comprise any suitable Newtonian mechanics or quantum mechanics equations, inequalities, or formulas that pertain in some way to the scientific instrument 304. In even other cases, the digital twin can comprise any suitable corrosion or degradation equations, inequalities, or formulas that pertain in some way to the scientific instrument 304.

In any case, the desktop application 302 can comprise any suitable number of any suitable types of underlying or substantive algorithms that relate in some way to the scientific instrument 304 (e.g., the above-mentioned machine learning algorithms for performing classification, segmentation, or regression on data recorded by the scientific instrument 304; or the above-mentioned digital twin algorithms for predicting or forecasting the behavior of the scientific instrument 304).

Now, in various aspects, there can be a cloud computing environment 306. In various instances, as shown, the cloud computing environment 306 can comprise a server device 308 and a client device 310.

In various cases, the client device 310 can be any suitable computing device that can be operated by a user. As a non-limiting example, the client device 310 can be a desktop computer. As another non-limiting example, the client device 310 can be a laptop computer. As even another non-limiting example, the client device 310 can be a mobile computing device, such as a smart phone or smart tablet. As yet another non-limiting example, the client device 310 can be a wearable computing device, such as smart glasses or a smart watch. As even another non-limiting example, the client device 310 can be a vehicle-integrated computing device, such as a dashboard computer. In any case, the client device 310 can comprise any suitable human-to-computer interfaces for receiving inputs from or for rendering outputs to a user. Non-limiting examples of such human-to-computer interfaces can include: touchscreens; other electronic screens or displays; keyboards, keypads, joysticks; microphones; or speakers.

In various aspects, the server device 308 can be any suitable computing device that can be physically remote from the client device 310 but that can perform computational services for or on behalf of the client device 310. In various instances, the server device 308 can electronically communicate (e.g., transmit data to, receive data from) the client device 310 via any suitable wireless electronic connection or connections. Non-limiting examples of such wireless electronic connections can include Internet connections, local area network (LAN) connections, or wide area network (WAN) connections. In various cases, whatever electronic connections or communication channels there are between the client device 310 and the server device 308 can be public (e.g., unencrypted) or private (e.g., encrypted). It should be appreciated that any suitable intermediate computing devices (not shown) can be implemented to facilitate the wireless connections or communication channels between the client device 310 and the server device 308, such as routers, modems, or internet access points.

In any case, the system 312 can be electronically integrated (e.g., via any suitable wired or wireless electronic connections) with the desktop application 302 and with the cloud computing environment 306. In various aspects, it can be desired to deploy or migrate the desktop application 302 on or to the cloud computing environment 306. In various instances, the system 312 can facilitate such deployment or migration, as described herein.

In various aspects, the system 312 can comprise a processor 314 (e.g., computer processing unit, microprocessor) and a non-transitory computer-readable memory 316 that is operably or operatively or communicatively connected or coupled to the processor 314. The non-transitory computer-readable memory 316 can store computer-executable instructions which, upon execution by the processor 314, can cause the processor 314 or other components of the system 312 (e.g., access component 318, cloud component 320) to perform one or more acts. In various embodiments, the non-transitory computer-readable memory 316 can store computer-executable components (e.g., access component 318, cloud component 320), and the processor 314 can execute the computer-executable components.

In various embodiments, the system 312 can comprise an access component 318. In various aspects, the access component 318 can electronically access the desktop application 302. That is, the access component 318 can electronically receive, electronically retrieve, or otherwise electronically obtain the desktop application 302, from any suitable electronic source or database (not shown). Accordingly, the access component 318 can be considered as a proxy or conduit through which other components of the system 312 can interact with, execute, or otherwise manipulate the desktop application 302. Furthermore, in various instances, the access component 318 can electronically access the cloud computing environment 306. That is, the access component 318 can electronically communicate or otherwise electronically interact with (e.g., transmit electronic instructions or commands to, receive electronic data from) the server device 308 or the client device 310. Accordingly, the access component 318 can be considered as a proxy or conduit through which other components of the system 312 can interact with, communicate with, or otherwise manipulate the server device 308 or the client device 310. However, these are mere non-limiting examples. In other cases, the access component 318 can be omitted, and any other components of the system 312 can communicate or interact directly with the desktop application 302 or the cloud computing environment 306.

In various embodiments, the system 312 can comprise a cloud component 320. In various aspects, as described herein, the cloud component 320 can electronically deploy the desktop application 302 onto the cloud computing environment 306, based on a nested MVP software architecture.

Figure 4:
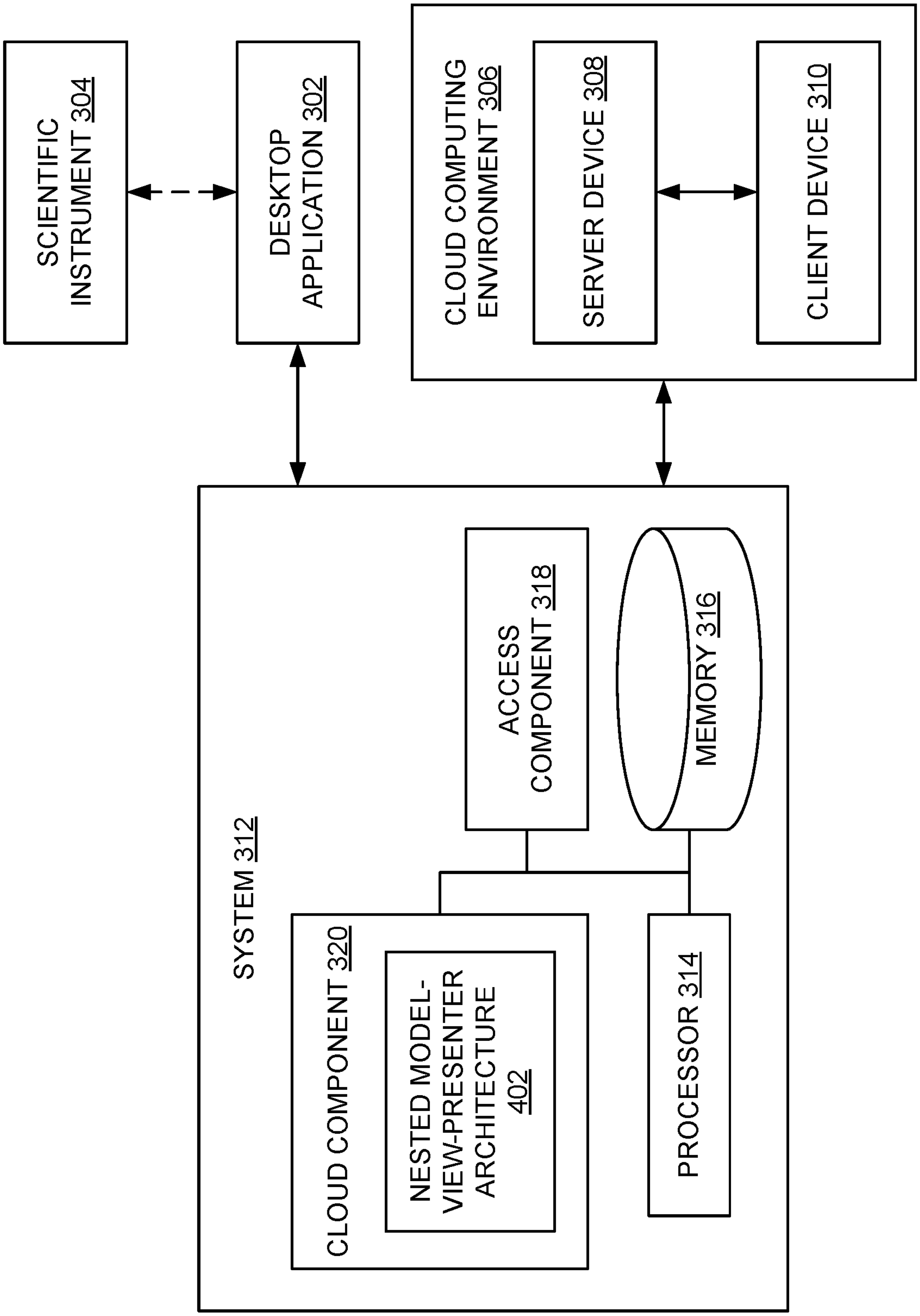
FIG. 4 illustrates a block diagram of an example, non-limiting system including a nested model-view-presenter architecture that facilitates desktop-to-cloud application migration in accordance with one or more embodiments described herein.

FIG. 4 illustrates a block diagram of an example, non-limiting system including a nested model-view-presenter architecture that can facilitate desktop-to-cloud application migration in accordance with one or more embodiments described herein. As shown, the system 312 can, in some cases, comprise a nested model-view-present architecture 402 (hereafter "nested MVP architecture 402").

In various embodiments, the cloud component 320 can electronically generate the nested MVP architecture 402, based on analyzing the desktop application 302, and the cloud component 320 can electronically utilize or leverage the nested MVP architecture 402 so as to deploy the desktop application 302 in or on the cloud computing environment 306. Various non-limiting aspects are described with respect to FIGS. 5-7.

Figure 5:
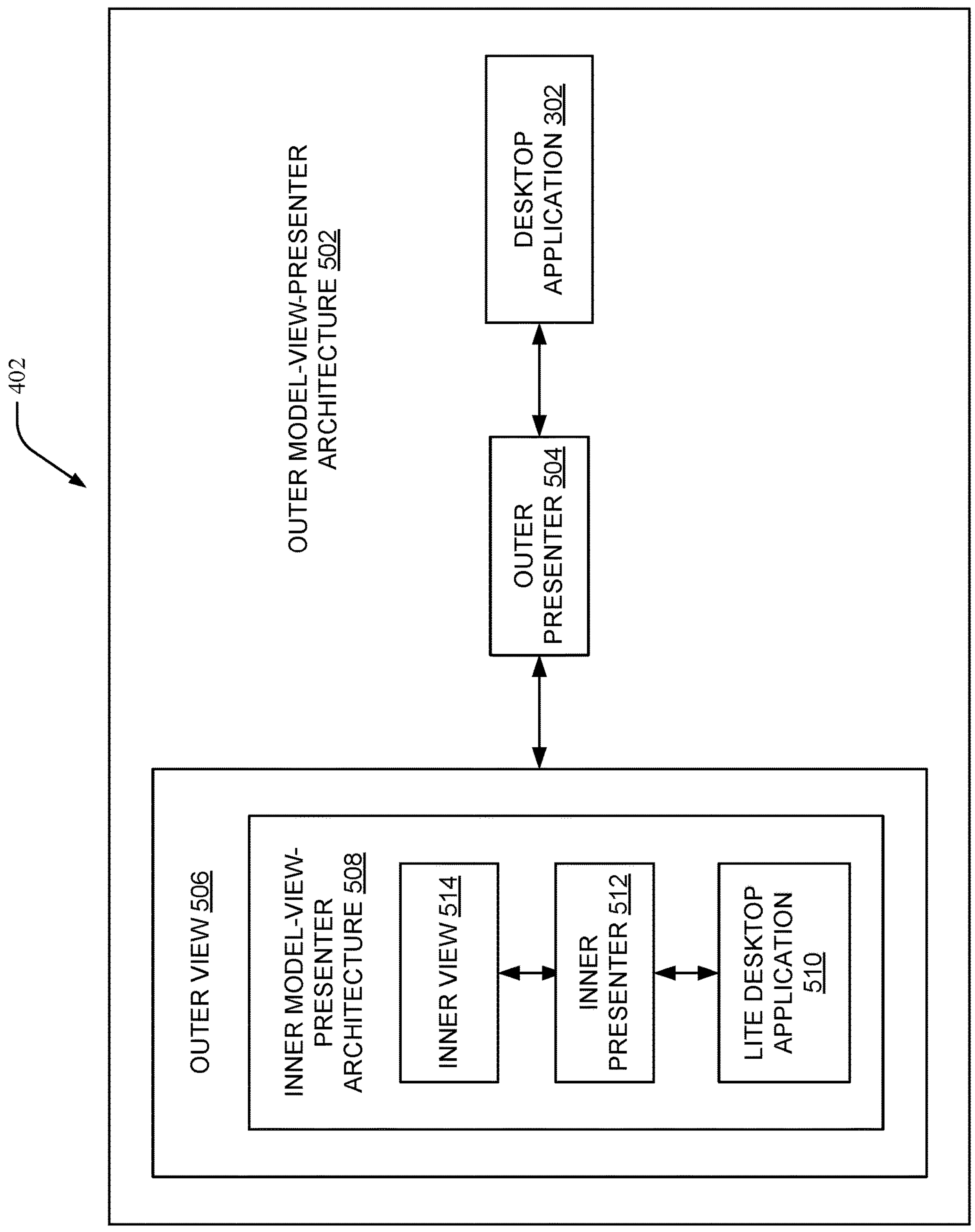
FIG. 5 illustrates an example, non-limiting block diagram showing a nested model-view-presenter architecture in accordance with one or more embodiments described herein.

FIG. 5 illustrates an example, non-limiting block diagram showing the nested MVP architecture 402 in accordance with one or more embodiments described herein.

In various embodiments, the nested MVP architecture 402 can comprise an outer model-view-presenter architecture 502 (hereafter "outer MVP architecture 502") and an inner model-view-presenter architecture 508 (hereafter "inner MVP architecture 508"). In various aspects, as shown, the inner MVP architecture 508 can be contained within, or can otherwise be considered as being inside of, the outer MVP architecture 502. Accordingly, the term "nested" can be appropriate.

Recall that an MVP architecture can be considered as a software coding pattern or archetype for streamlining software interface development. In particular, an MVP architecture can be made up of three components: a data model; a view; and a presenter; hence the name "model-view-presenter." A data model can be whatever discrete portion of code defines or generates the underlying data that is to be displayed or rendered to a user. A view can be whatever discrete portion of code actually displays or renders data so as to be viewable by a user. A presenter can be a discrete portion of code that acts as an intermediary between a view and a data model. In particular, the view can forward user commands or inputs to the presenter, the presenter can fetch outputs that are responsive to those user commands or inputs from the data model, and the presenter can instruct the view to display those fetched outputs to the user.

Given this, both the outer MVP architecture 502 and the inner MVP architecture 508 can be considered as being made up of respective data models, views, and presenters. In particular, the view of the outer MVP architecture 502 can be referred to as an outer view 506, the presenter of the outer MVP architecture 502 can be referred to as an outer presenter 504, and the data model of the outer MVP architecture 502 can be considered as the desktop application 302. Moreover, the view of the inner MVP architecture 508 can be referred to as an inner view 514, the presenter of the inner MVP architecture 508 can be referred to as an inner presenter 512, and the data model of the inner MVP architecture 508 can be referred to as a lite desktop application 510. In various instances, as shown, the outer view 506 can be or otherwise comprise the inner MVP architecture 508. In other words, the outer view 506 can, in some cases, be considered as the collective totality of the inner view 514, the inner presenter 512, and the lite desktop application 510.

Now, as mentioned above, the desktop application 302 can be any suitable computer program that can comprise, contain, or otherwise implement any suitable underlying algorithms that somehow relate to the scientific instrument 304. In various aspects, the lite desktop application 510 can, as conveyed by the term "lite", be a pruned, compressed, compact, or otherwise computationally smaller version of the desktop application 302. In other words, the lite desktop application 510 can comprise fewer lines of code (e.g., in some cases, one or more orders of magnitude fewer) than the desktop application 302.

As a non-limiting example, the lite desktop application 510 can, in some aspects, exclude or lack one or more of the underlying algorithms (e.g., machine learning models, digital twin formulations) of the desktop application 302. Thus, in such cases, the lite desktop application 510 can be unable to compute or generate outputs that the desktop application 302 can compute or generate. However, in such cases, the lite desktop application 510 can nevertheless comprise metadata regarding or pertaining to those underlying algorithms. For instance, the lite desktop application 510 can indicate or specify how many or what types of underlying algorithms the desktop application 302 has. As another instance, the lite desktop application 510 can indicate or specify how many or what types of parameters (e.g., weight matrices, convolutional kernels, aberration coefficients, Hamilton elements) the underlying algorithms of the desktop application 302 have. As even another instance, the lite desktop application 510 can indicate or specify how many or what types of arguments (e.g., voltages, currents, temperatures, pressures, chemical spectra, spectral images) the underlying algorithms of the desktop application 302 operate on. As still another instance, the lite desktop application 510 can indicate or specify how many or what types of outputs (e.g., classification labels, segmentation masks, regressions, forecasted instrument behaviors, forecasted instrument wear) the underlying algorithms of the desktop application 302 compute. In some cases, the lite desktop application 510 can electronically store or otherwise electronically maintain any specific outputs that are computed or generated by the underlying algorithms of the desktop application 302, even though the lite desktop application 510 can be unable to compute or generate such specific outputs on its own. Furthermore, even though the lite desktop application 510 can exclude or lack the underlying algorithms of the desktop application 302, the lite desktop application 510 can nevertheless comprise any suitable data exploration or post-processing algorithms (e.g., Fourier transform algorithms, trendline algorithms, hypothesis testing algorithms, histogram computation algorithms) that can be implemented to explore or post-process whatever specific outputs are stored or maintained in the lite desktop application 510.

As another non-limiting example, rather than excluding or omitting the underlying algorithms of the desktop application 302, the lite desktop application 510 can, in some aspects, comprise or contain smaller, compressed, or simpler versions of those underlying algorithms. For instance, suppose the desktop application 302 comprises a deep learning segmenter that is configured to produce segmentation masks for spectral images recorded or measured by the scientific instrument 304. In such case, the lite desktop application 510 can comprise its own deep learning segmenter that is also configured to generate segmentation masks for spectral images recorded or measured by the scientific instrument 304. However, the deep learning segmenter of the lite desktop application 510 can comprise fewer layers (e.g., in some cases, one or more orders of magnitude fewer) than the deep learning segmenter of the desktop application 302. As another instance, suppose the desktop application 302 comprises a physics-based wear formulation that predicts accumulated wear of the scientific instrument 304 based on numerous properties or characteristics of the scientific instrument 304 (e.g., the physical-based wear formulation can have coefficients that represent dimensions, mass, stiffness, yield strength, heat conductivity, heat capacity, resistance, and impedance of the scientific instrument 304). In such case, the lite desktop application 510 can comprise its own physics-based wear formulation that predicts accumulated wear of the scientific instrument 304. However, the physics-based wear formulation of the lite desktop application 510 can be based on fewer characteristics or properties of the scientific instrument 304 (e.g., the physical-based wear formulation can have coefficients that represent only dimensions, mass, and heat conductivity of the scientific instrument). In any of such cases, the lite desktop application 510 can be considered as being able to compute or generate outputs that are computable or generatable by the desktop application 302, but the lite desktop application 510 can facilitate such computation or generation more quickly and less accurately than the desktop application 302.

Now, as mentioned above, the lite desktop application 510 can be considered as the data model of the inner MVP architecture 508, the inner view 514 can be considered as the view of the inner MVP architecture 508, and the inner presenter 512 can be considered as the presenter of the inner MVP architecture 508. Accordingly, in various aspects, the inner view 514 can be any suitable script or lines of code that can forward user-provided inputs to the inner presenter 512 and that can display to the user whatever data is passed to it from the inner presenter 512; and the inner presenter 512 can be any suitable script or lines of code that can receive user-provided inputs from the inner view 514, that can fetch from the lite desktop application 510 data that is responsive to those user-provided inputs, and that can provide that data back to the inner view 514 for display to the user.

Likewise, as mentioned above, the desktop application 302 can be considered as the data model of the outer MVP architecture 502, the outer view 506 can be considered as the view of the outer MVP architecture 502, and the outer presenter 504 can be considered as the presenter of the outer MVP architecture 502. Accordingly, in various aspects, the outer presenter 504 can be any suitable script or lines of code that can receive user-provided inputs from the outer view 506, that can fetch from the desktop application 302 data that is responsive to those user-provided inputs, and that can provide that data back to the outer view 506 for display to the user.

Now, as mentioned above, the outer view 506 can be considered as comprising, containing, or otherwise being equivalent to the inner MVP architecture 508, which includes the inner presenter 512. In various aspects, whatever user-provided inputs that are received by the outer presenter 504 from the outer view 506 can be more granularly or specifically considered as coming from the inner presenter 512. In particular, the inner presenter 512 can comprise any suitable lines of code that, when given any user-provided input from the inner view 514, can determine whether or not the lite desktop application 510 is able to handle or respond to the given user-provided input. If so, the inner presenter 512 can proceed by interacting with the lite desktop application 510. If not, the inner presenter 512 can instead proceed by interacting with the outer presenter 504.

As a non-limiting example, suppose that the lite desktop application 510 omits the underlying algorithms of the desktop application 302 (e.g., in such case, the lite desktop application 510 can be able to post-process or explore any data outputted by the desktop application 302, but the lite desktop application 510 can be unable to output such data by itself). Now, the user can provide to the inner view 514 a given input. In various cases, the given input can be any suitable electronic data exhibiting any suitable format, size, or dimensionality. That is, the given input can be one or more scalars, one or more vectors, one or more matrices, one or more tensors, one or more character strings, or any suitable combination thereof. In any case, the given input can substantively relate to the desktop application 302 in some way. For instance, the given input can, in some cases, request the computation of new data (e.g., of new classification labels, of new segmentation masks, of new regressions, of new forecasted instrument behaviors, of new forecasted instrument wear accumulations). In other cases, the given input can instead request the exploration or post-processing of already-computed data (e.g., of already-computed classification labels, of already-computed segmentation masks, of already-computed regressions, of already-computed forecasted instrument behaviors, of already-computed forecasted instrument wear accumulations). In various aspects, the inner view 514 can pass or forward the given input to the inner presenter 512, and the inner presenter 512 can evaluate or determine whether the lite desktop application 510 is able to handle, respond to, or otherwise satisfy the given input.

Suppose that the given input requests the computation of new data that is not yet stored in the lite desktop application 510. In such case, the inner presenter 512 can conclude that the lite desktop application 510 is not able to handle, respond to, or satisfy the given input. Accordingly, the inner presenter 512 can pass or forward the given input to the outer presenter 504. Thus, the outer presenter 504 can instruct or command the desktop application 302 to compute or generate whatever new data is requested by the given input, the desktop application 302 can do so, and the outer presenter 504 can pass or forward such new data to the inner presenter 512. At such point, the inner presenter 512 can instruct or command the inner view 514 to display or render such new data to the user. In some cases, the inner presenter 512 can also instruct or command the lite desktop application 510 to store or maintain that new data, just in case the user desires to explore or post-process that new data in the future.

Suppose instead that the given input requests the exploration or post-processing of previous data that is already stored in the lite desktop application 510. In such case, the inner presenter 512 can conclude that the lite desktop application 510 is able to handle, respond to, or satisfy the given input. Accordingly, the inner presenter 512 can instruct or command the lite desktop application 510 to explore or post-process that previous data as requested by the given input, the lite desktop application 510 can do so, and the inner presenter 512 can instruct or command the inner view 514 to display or render the results of such exploration or post-processing to the user.

As another non-limiting example, suppose that the lite desktop application 510 comprises smaller or simpler versions of the underlying algorithms of the desktop application 302 (e.g., in such case, the lite desktop application 510 can be able to compute or generate new data more quickly but less accurately than the desktop application 302). Now, the user can provide to the inner view 514 a particular input. As above, the particular input can be any suitable electronic data exhibiting any suitable format, size, or dimensionality (e.g., can be one or more scalars, one or more vectors, one or more matrices, one or more tensors, one or more character strings, or any suitable combination thereof). In any case, the particular input can substantively relate to the desktop application 302 in some way. For instance, the particular input can, in some cases, request the computation of new data using at least a threshold level of accuracy. In other cases, the given input can instead: request the computation of new data using less than the threshold level of accuracy; or request the exploration or post-processing of already-computed data. In various aspects, the inner view 514 can pass or forward the given input to the inner presenter 512, and the inner presenter 512 can evaluate or determine whether the lite desktop application 510 is able to handle, respond to, or otherwise satisfy the given input.

Suppose that the particular input requests the computation of new data using at least the threshold level of accuracy. In such case, the inner presenter 512 can conclude that the lite desktop application 510 is not able to handle, respond to, or satisfy the particular input. Accordingly, the inner presenter 512 can pass or forward the particular input to the outer presenter 504. Thus, the outer presenter 504 can instruct or command the desktop application 302 to compute or generate whatever new data is requested by the given input, the desktop application 302 can do so, and the outer presenter 504 can pass or forward such new data to the inner presenter 512. At such point, the inner presenter 512 can instruct or command the inner view 514 to display or render such new data to the user. As above, in some cases, the inner presenter 512 can instruct or command the lite desktop application 510 to store or maintain that new data, just in case the user desires to explore or post-process that new data in the future.

Suppose instead that the particular input requests the computation of new data below the threshold level of accuracy, or requests the exploration or post-processing of previous data that is already stored in the lite desktop application 510. In such case, the inner presenter 512 can conclude that the lite desktop application 510 is able to handle, respond to, or satisfy the particular input. Accordingly, the inner presenter 512 can instruct or command the lite desktop application 510 to compute, explore, or post-process as requested by the particular input, the lite desktop application 510 can do so, and the inner presenter 512 can instruct or command the inner view 514 to display or render the results of such computation, exploration, or post-processing to the user.

Figure 6:
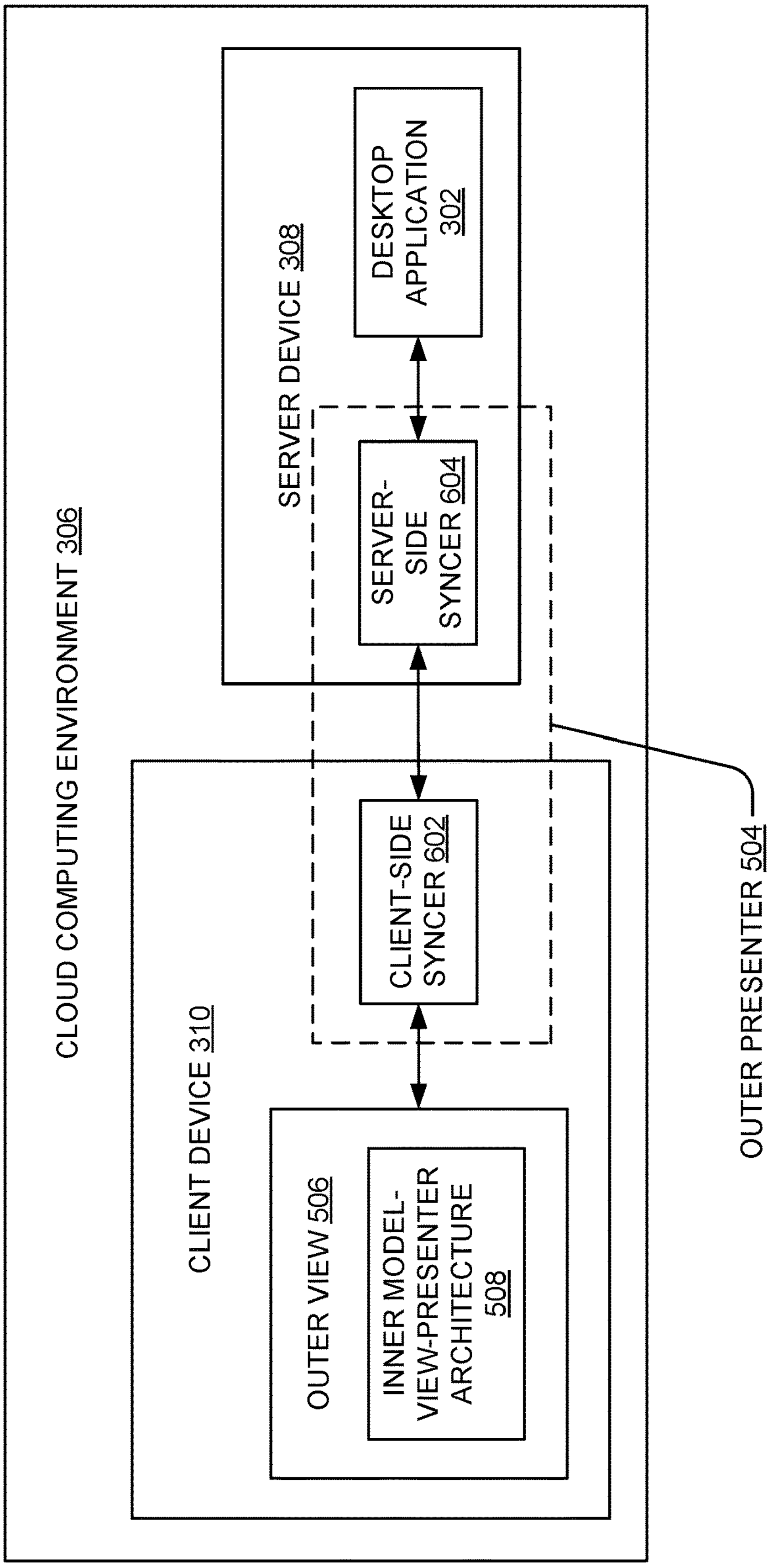
FIG. 6 illustrates an example, non-limiting block diagram showing how a nested model-view-presenter architecture can be distributed in or over a cloud computing environment in accordance with one or more embodiments described herein.

FIG. 6 illustrates an example, non-limiting block diagram showing how the nested MVP architecture 402 can be distributed in or over the cloud computing environment 306 in accordance with one or more embodiments described herein.

In various embodiments, the cloud component 320 can distribute or allocate the nested MVP architecture 402 on or across the cloud computing environment 306 as shown in FIG. 6. In particular, the desktop application 302 can be electronically hosted, electronically executed, electronically run, or otherwise electronically compiled by or on the server device 308. In various aspects, the outer view 506, and thus the inner MVP architecture 508, can instead be electronically hosted, electronically executed, electronically run, or otherwise electronically compiled by or on the client device 310. In various cases, the client device 310 can utilize any suitable interfacing platform to compile the outer view 506 and thus the inner MVP architecture 508. As a non-limiting example, the client device 310 can utilize WebAssembly to compile the outer view 506 and thus the inner MVP architecture 508.

In various instances, the outer presenter 504 can, as shown, be electronically hosted, electronically executed, electronically run, or otherwise electronically compiled by or on both the server device 308 and the client device 310. More specifically, the outer presenter 504 can, in various cases, be divided, broken up, or decomposed into two distinct portions: a client-side syncer 602 and a server-side syncer 604. In various aspects, the server-side syncer 604 can be whichever lines of code belonging to the outer presenter 504 that are hosted, executed, run, or compiled by or on the server device 308. In contrast, the client-side syncer 602 can be whichever lines of code belonging to the outer presenter 504 that are hosted, executed, run, or compiled by or on the client device 310. Note that, in some cases, this bifurcation of the outer presenter 504 into the client-side syncer 602 and the server-side syncer 604 can be considered as a generalized way to overcome possible or potential mismatches in default communication protocols between the server device 308 and the client device 310.

Indeed, suppose that the client device 310 and the server device 308 utilize different but known communication protocol standards. In some of such cases, the client-side syncer 602 can contain any suitable code that can translate whatever known communication protocols are used by the client device 310 so as to match or be consistent with whatever known communication protocols are used by the server device 308. In others of such cases, the server-side syncer 604 can contain any suitable code that can translate whatever known communication protocols are used by the server device 308 so as to match or be consistent with whatever known communication protocols are used by the client device 310. In even others of such cases, the client-side syncer 602 can contain any suitable code that can translate whatever known communication protocols are used by the client device 310 into some third communication protocols standard, and the server-side syncer 604 can contain any suitable code that can translate whatever known communication protocols are used by the server device 308 into that same third communication protocols standard. Accordingly, the bifurcation of the outer presenter 504 into the client-side syncer 602 and the server-side syncer 604 can be considered as indicating that known communication protocol mismatches can be taken into account or otherwise rectified client-side, server-side, or both.

However, this is a mere non-limiting example. In other cases, there might not be any mismatch between the known communication protocols of the client device 310 and the server device 308. In such cases, the outer presenter 504 can be not bifurcated. Instead, the entirety of the outer presenter 504 can be electronically hosted, electronically executed, electronically run, or otherwise electronically compiled on the server device 308 alone or on the client device 310 alone.

In any case, distributing or allocating the nested MVP architecture 402 in or across the cloud computing environment 306 in this way can be considered as helping to reduce accumulation of server-client communication latency. This is further described with respect to FIG. 7.

Figure 7:
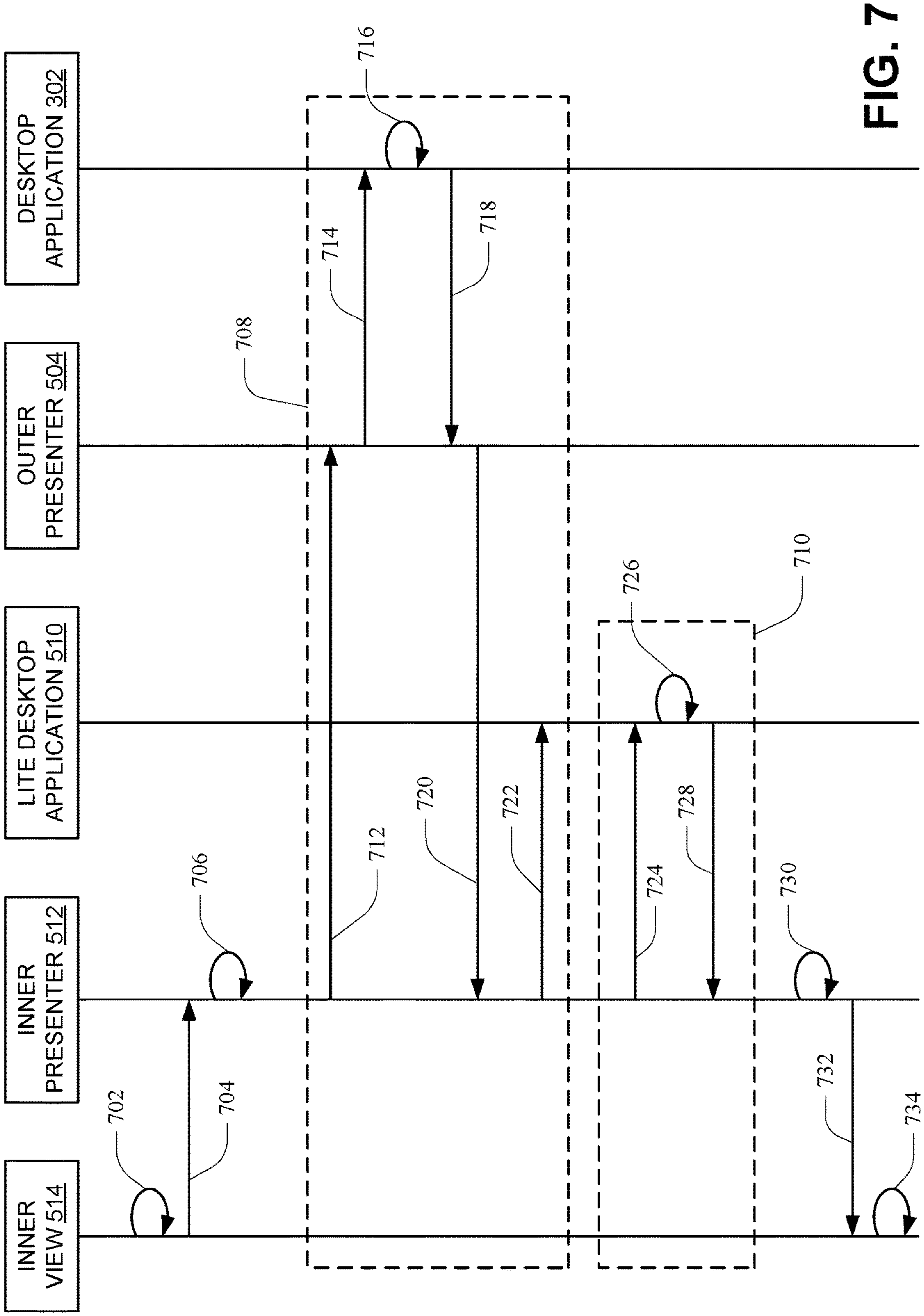
FIG. 7 illustrates an example, non-limiting communication diagram showing how a nested model-view-presenter architecture can operate in accordance with one or more embodiments described herein.

FIG. 7 illustrates an example, non-limiting communication diagram showing how the nested MVP architecture 402 can operate in accordance with one or more embodiments described herein.

In various aspects, act 702 can involve receiving, by the inner view 514, an input (e.g., scalars, vectors, matrices, tensors, character strings, or any combination thereof) from a user of the client device 310. In various cases, the user can provide such input via any suitable human-to-computer interface of the client device 310, such as a keyboard, keypad, or touchscreen.

In various instances, act 704 can involve passing or forwarding, by the inner view 514, the input to the inner presenter 512.

In various cases, act 706 can involve determining, by the inner presenter 512, whether or not the lite desktop application 510 is capable of handling or responding to the input. As mentioned above, this can be based on whether the input requests: the computation of new outputs that cannot be generated by the lite desktop application 510; or exploration or post-processing of previous outputs that are already stored or maintained in the lite desktop application 510. If the inner presenter 512 determines that the lite desktop application 510 is not capable of handling or responding to the input, then the acts encompassed by numeral 708 can be commenced. On the other hand, if the inner presenter 512 instead determines that the lite desktop application 510 is capable of handling or responding to the input, then the acts encompassed by numeral 710 can be commenced.

First, consider the acts encompassed by the numeral 708.

In various aspects, act 712 can involve passing or forwarding, by the inner presenter 512, the input to the outer presenter 504 (e.g., to the client-side syncer 602 which can commensurately pass or forward the input to the server-side syncer 604).

In various instances, act 714 can involve instructing or commanding, by the outer presenter 504, the desktop application 302 to compute, generate, produce, or otherwise return whatever resultant data is requested by the input.

In various cases, act 716 can involve computing, generating, producing, or otherwise returning, by the desktop application 302, that resultant data.

In various aspects, act 718 can involve passing or forwarding, by the desktop application 302, that resultant data to the outer presenter 504.

In various instances, act 720 can involve passing or forwarding, by the outer presenter 504, that resultant data to the inner presenter 512.

In some cases, act 722 can involve instructing or commanding the lite desktop application 510 to store or maintain that resultant data, in case future exploration or post-processing of that resultant data is subsequently desired or requested by the user.

Now, consider the acts encompassed by the numeral 710.

In various aspects, act 724 can involve instructing or commanding, by the inner presenter 512, the lite desktop application 510 to compute, generate, produce, or otherwise return whatever resultant data is requested by the input.

In various instances, act 726 can involve computing, generating, producing, or otherwise returning, by the lite desktop application 510, that resultant data.

In various cases, act 728 can involve passing or forwarding, by the lite desktop application 510, that resultant data to the inner presenter 512.

Once the acts encompassed either by the numeral 708 or the numeral 710 are completed, the inner presenter 512 can be considered as having or possessing whatever resultant data is responsive to the input that was provided by the user.

In various aspects, act 730 can involve determining how that resultant data should be visually or audibly formatted (e.g., visual sizing, visual font styles, visual colors, audible volume).

In various instances, act 732 can involve instructing or commanding, by the inner presenter 512, the inner view 514 to visually display, audibly play, or otherwise render that resultant data on the client device 310.

Note that, because the desktop application 302 can be hosted by the server device 308, and because the lite desktop application 510 can be hosted by the client device 310, the acts encompassed by the numeral 708 can involve a round of electronic communication between the client device 310 and the server device 308, whereas the acts encompassed by the numeral 710 can instead involve no such round of electronic communication between the client device 310 and the server device 308. Accordingly, when the nested MVP architecture 402 is implemented as described herein, rounds of client-server communication can be conducted only for user-supplied inputs that the inner presenter 512 determines cannot be handled or responded to by the lite desktop application 510. This can ultimately reduce the total number of client-server communication rounds that occur, as compared to existing techniques that would instead require a distinct client-server communication round for every user-supplied input.

Figure 8:
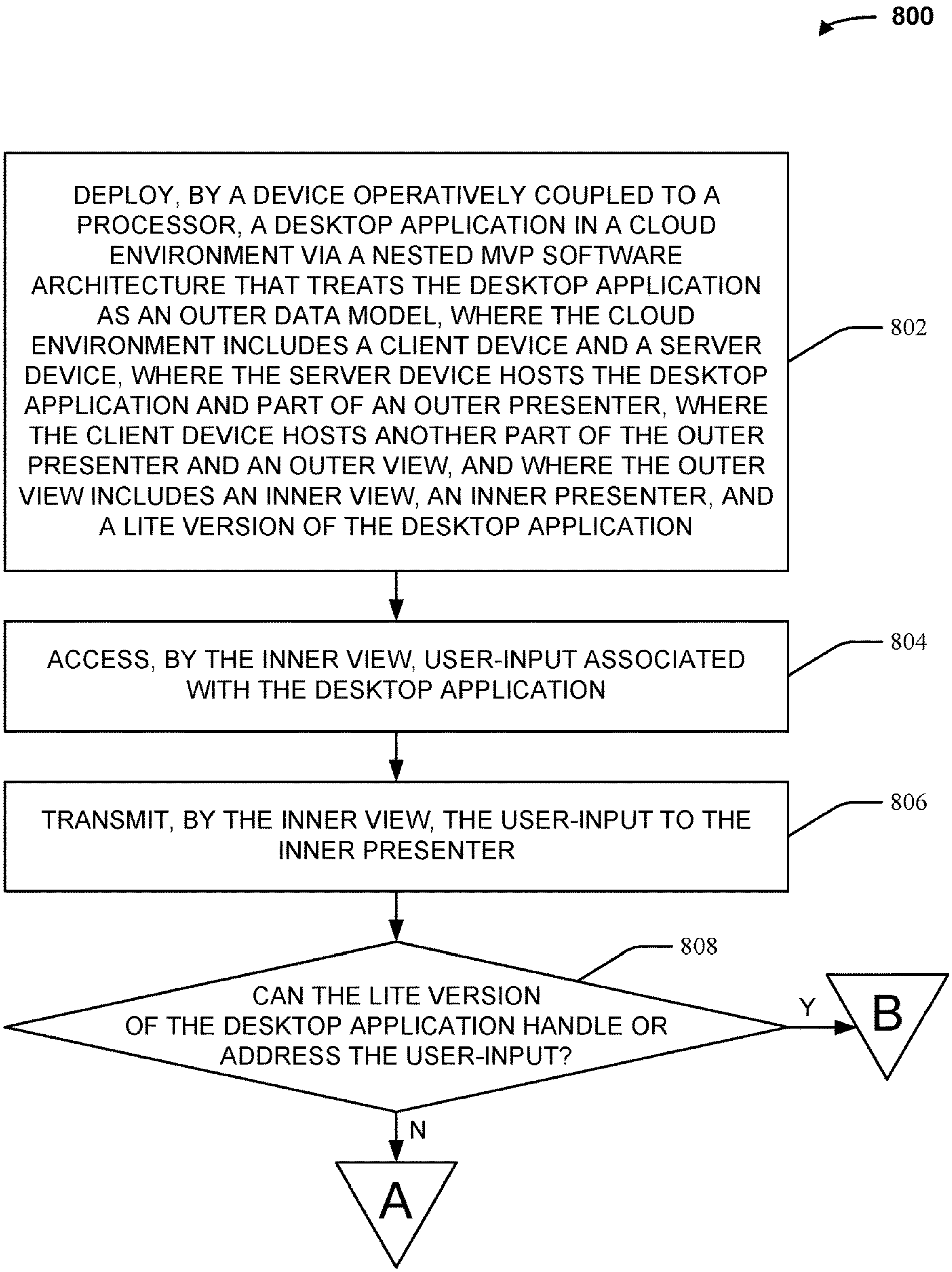
Figure 10:
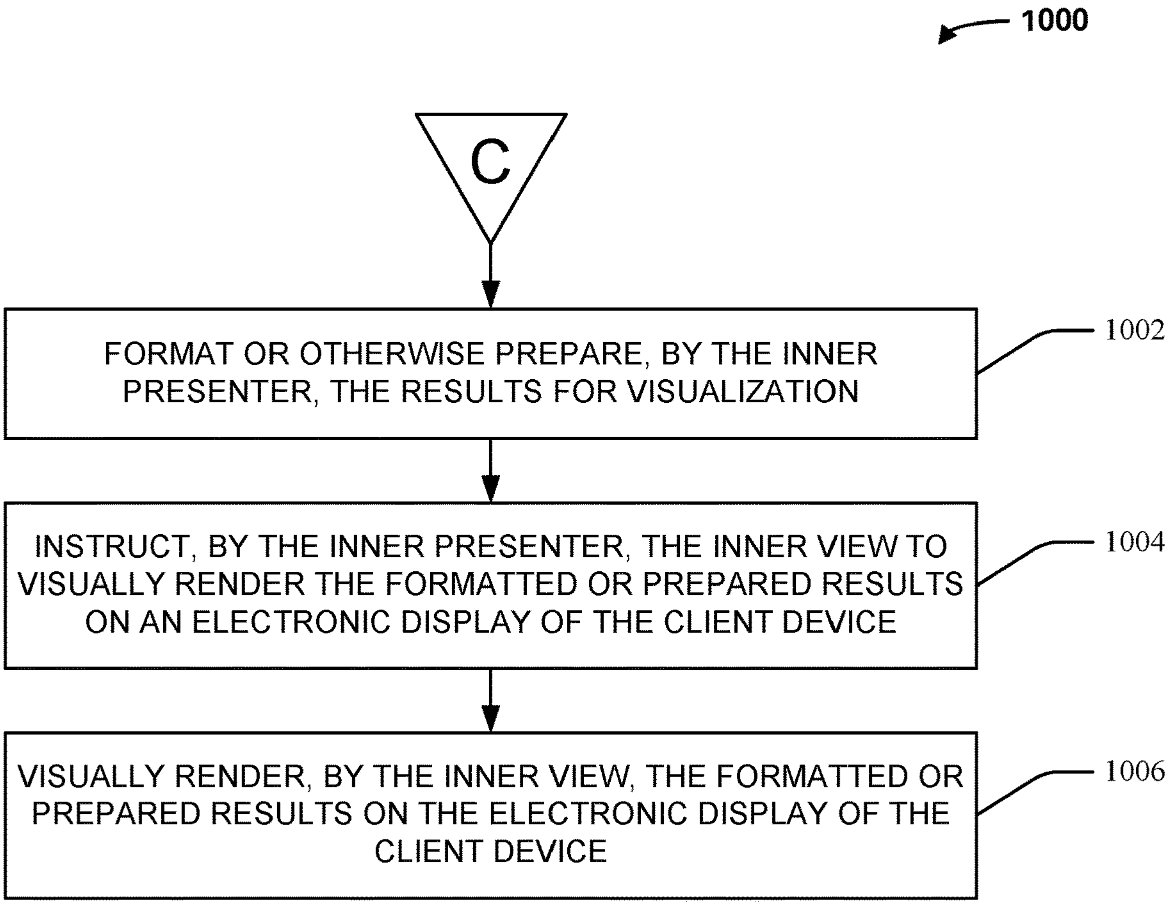

FIGS. 8-10 illustrate flow diagrams of example, non-limiting computer-implemented methods 800, 900, and 1000 that can facilitate desktop-to-cloud application migration in accordance with one or more embodiments described herein. In various cases, the system 312 can facilitate the computer-implemented methods 800, 900, and 1000.

First, consider FIG. 8. In various embodiments, act 802 can include deploying, by a device (e.g., via 312) operatively coupled to a processor (e.g., 314), a desktop application (e.g., 302) in a cloud environment (e.g., 306) via a nested MVP software architecture (e.g., 402) that treats the desktop application as an outer data model (e.g., as the data model of 502). In various aspects, the cloud environment can include a client device (e.g., 310) and a server device (e.g., 308). In various instances, the server device can host the desktop application and part (e.g., 604) of an outer presenter (e.g., 504). In various cases, the client device can host another part (e.g., 602) of the outer presenter and an outer view (e.g., 506). In various aspects, the outer view can include an inner view (e.g., 514), an inner presenter (e.g., 512), and a lite version (e.g., 510) of the desktop application.

In various instances, act 804 can include accessing, by the inner view, user-input associated with the desktop application.

In various cases, act 806 can include transmitting, by the inner view, the user-input to the inner presenter.

In various aspects, act 808 can include determining, by the inner presenter, whether the lite version of the desktop application can handle or address the user-input. If not, the computer-implemented method 800 can proceed to act 902 of the computer-implemented method 900. If so, the computer-implemented method 800 can instead proceed to act 912 of the computer-implemented method 900.

Now, consider FIG. 9. In various embodiments, act 902 can include transmitting, by the inner presenter, the user-input to the outer presenter.

In various aspects, act 904 can include updating, adjusting, or otherwise instructing, by the outer presenter, the desktop application based on the user-input.

In various instances, act 906 can include generating, by the desktop application, results in response to the updating, adjusting, or instructing by the outer presenter.

In various cases, act 908 can include transmitting, by the desktop application, the results to the outer presenter.

In various aspects, act 910 can include transmitting, by the outer presenter, the results to the inner presenter. In various cases, the computer-implemented method 900 can then proceed to act 1002 of the computer-implemented method 1000.

In various instances, act 912 can include updating, adjusting, or otherwise instructing, by the inner presenter, the lite version of the desktop application based on the user-input.

In various cases, act 914 can include generating, by the lite version of the desktop application, results in response to the updating, adjusting, or instructing by the inner presenter.

In various cases, act 916 can include transmitting, by the lite version of the desktop application, the results to the inner presenter. In various aspects, the computer-implemented method 900 can then proceed to act 1002 of the computer-implemented method 1000.

Now, consider FIG. 10. In various embodiments, act 1002 can include formatting or otherwise preparing, by the inner presenter, the results for visualization.

In various aspects, act 1004 can include instructing, by the inner presenter, the inner view to visually render the formatted or prepared results on an electronic display of the client device.

In various instances, act 1006 can include visually rendering, by the inner view, the formatted or prepared results on the electronic display of the client device.

Much discussion has so far been focused on how the nested MVP architecture 402 can function and be distributed in the cloud computing environment 306. Some of the following description can be considered as explaining how the nested MVP architecture 402 can be generated in the first place. In various aspects, the cloud component 320 can electronically generate the nested MVP architecture 402, by leveraging various automated operations such as code compilation, syntactic parsing, code introspection, or data type matching/association. Various non-limiting details are described with respect to FIGS. 11-15.

FIGS. 11-15 illustrate example, non-limiting block diagrams showing how the nested MVP architecture 402 can be generated in accordance with one or more embodiments described herein.

Figure 11:
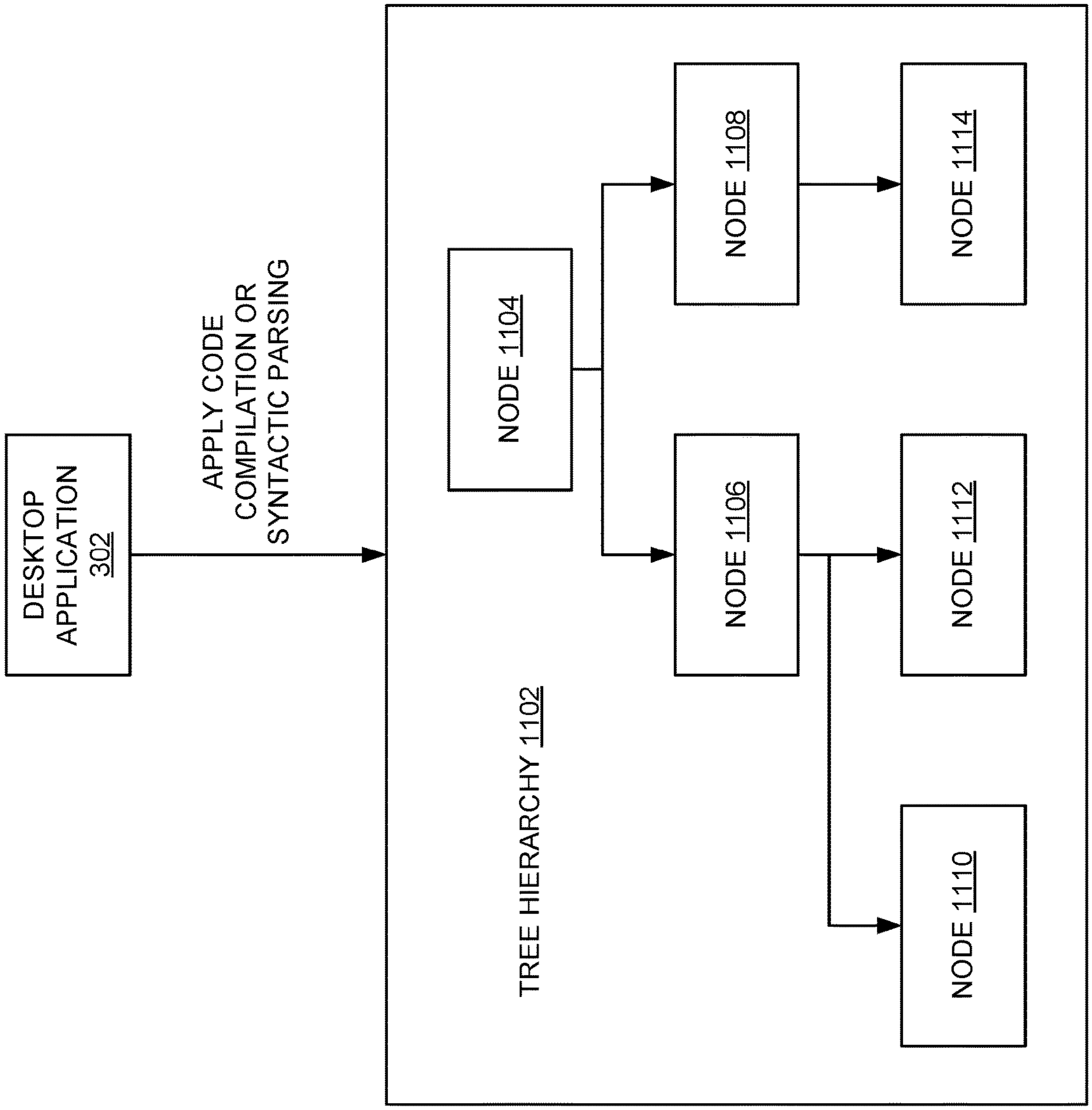
FIGS. 11-15 illustrate example, non-limiting block diagrams showing how a nested model-view-presenter architecture can be generated in accordance with one or more embodiments described herein.

First, consider FIG. 11. In various aspects, the cloud component 320 can, in response to any suitable number of preprocessor directives, apply or perform any suitable code compilation or syntactic parsing techniques on the desktop application 302. In various instances, application or performance of such compilation or parsing can yield a tree hierarchy 1102. In various cases, the tree hierarchy 1102 can convey, indicate, or otherwise represent the internal structure or organization of the coding script of the desktop application 302. In particular, the tree hierarchy 1102 can be a directed graph whose nodes indicate distinct or discrete blocks, sections, or lines of code within the script of the desktop application 302, and whose edges indicate which blocks, sections, or lines of code contain, rely upon, or depend upon each other. Accordingly, the application or performance of compilation or parsing can be considered as a form of script reading that can uncover or reveal how the code of the desktop application 302 is organized or arranged.

For instance, the tree hierarchy 1102 can indicate that the desktop application 302 comprises: a node 1104 that depends or relies upon a node 1106 and a node 1108; where the node 1106 depends or relies upon a node 1110 and a node 1112; and where the node 1108 depends or relies upon a node 1114. In various instances, each node can represent or otherwise correspond to one or more respective lines of code within the script of the desktop application 302, where such one or more respective lines of code collectively play a discrete, cohesive role within the overall or total functionality of the desktop application 302. As a non-limiting example, the node 1104 can, in some cases, represent a discrete section or loop (e.g., for-loop, if-loop, while-loop) of the desktop application 302. In such case, the node 1106 can represent a first algorithm that is written in that discrete section or loop, and the node 1108 can represent a second algorithm that is written in that discrete section or loop. Moreover, in such case, the node 1110 can represent a first parameter that is utilized by the first algorithm represented by the node 1106, and the node 1112 can represent a second parameter that is utilized by the first algorithm represented by the node 1106. Likewise, the node 1114 can represent a third parameter that is utilized by the second algorithm represented by the node 1108. Although not explicitly shown in FIG. 11, additional nodes can be downstream of the node 1110, of the node 1112, or of the node 1114 (e.g., such additional downstream nodes can indicate respective attributes or properties of the first, second, and third parameters respectively represented by the node 1110, the node 1112, and the node 1114).

It is to be appreciated that FIG. 11 is a mere non-limiting example of the tree hierarchy 1102. In various aspects, the tree hierarchy 1102 can comprise any suitable number of any suitable types of nodes arranged in any suitable fashion or dependency order.

Note that, in various instances, the node 1104 can be considered as a root node of the tree hierarchy 1102 (e.g., a node that has no parent nodes); the nodes 1106-1108 can be considered as composite nodes of the tree hierarchy 1102 (e.g., as nodes that have parent nodes and child nodes); and the nodes 1110-1114 can be considered as leaf nodes (e.g., nodes that have no child nodes).

In any case, the cloud component 320 can generate the tree hierarchy 1102 by performing code compilation or syntactic parsing (e.g., in C++ or any other suitable coding language) on the desktop application 302, and the tree hierarchy 1102 can represent or indicate the internal organization or arrangement of whatever constituent pieces, snippets, modules, blocks, or lines of code that make up the script of the desktop application 302.

Figure 12:
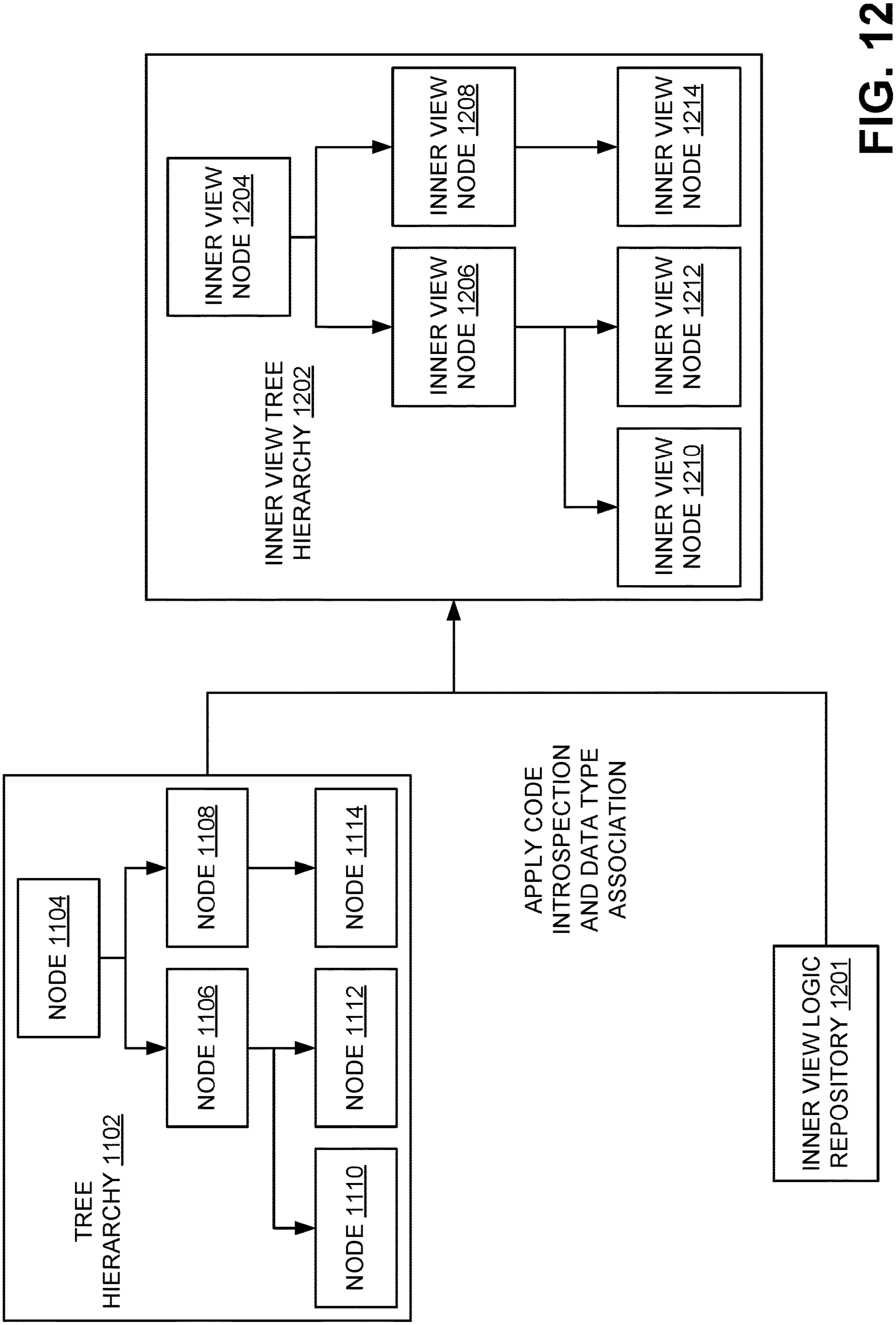

Now, consider FIG. 12. In various aspects, the cloud component 320 can electronically store, electronically maintain, or otherwise electronically access an inner view logic repository 1201. In various instances, the inner view logic repository 1201 can be any suitable list, set, group, or collection of prewritten logics, where each prewritten logic can be one or more lines of code that perform or facilitate any suitable universal functionality that is ordinarily, normally, or otherwise often associated with MVP views. In various cases, the inner view logic repository 1201 can be collated by data type. In other words, each prewritten logic in the inner view logic repository 1201 can be considered as being linked, mapped, or otherwise associated with a respective data type. In still other words, each prewritten logic in the inner view logic repository 1201 can be considered as being appropriately used for the viewing of a respective data type.

In various aspects, the cloud component 320 can perform code introspection on the tree hierarchy 1102. Such introspection can reveal respective data types of each of the nodes in the tree hierarchy 1102. As a non-limiting example, such introspection can reveal: a first data type that is exhibited by the node 1104; a second data type that is exhibited by the node 1106; a third data type that is exhibited by the node 1108; a fourth data type that is exhibited by the node 1110; a fifth data type that is exhibited by the node 1112; and a sixth data type that is exhibited by the node 1114.

In various instances, the cloud component 320 can then perform data type matching or association between the tree hierarchy 1102 and the inner view logic repository 1201. In various cases, such matching or association can be facilitated by iterating through the tree hierarchy 1102, and such iteration can incrementally generate an inner view tree hierarchy 1202.

For instance, the cloud component 320 can begin with the node 1104. Because of the above-described introspection, the cloud component 320 can know whatever data type that is exhibited by the node 1104. In various aspects, the cloud component 320 can search through the inner view logic repository 1201 for a prewritten logic that is linked, mapped, or associated to that same data type. In some instances, the cloud component 320 can identify only a single prewritten logic that is linked, mapped, or associated to that same data type. In other instances, the cloud component 320 can identify multiple prewritten logics that are linked, mapped, or associated to that same data type, and the cloud component 320 can select any one of those multiple prewritten logics according to any suitable selection priority (e.g., can select randomly). In any case, the cloud component 320 can identify a prewritten logic in the inner view logic repository 1201 that corresponds to the data type exhibited by the node 1104, and that prewritten logic can be referred to as an inner view node 1204.

Next, the cloud component 320 can iterate to the node 1106 in the tree hierarchy 1102. As above, introspection can cause the cloud component 320 to know whatever data type is exhibited by the node 1106, and the cloud component 320 can search for a prewritten logic in the inner view logic repository 1201 that is linked, mapped, or associated to that same data type. In various cases, that prewritten logic can be referred to as an inner view node 1206.

Likewise, the cloud component 320 can iterate to the node 1108 in the tree hierarchy 1102. Just as above, introspection can cause the cloud component 320 to know whatever data type is exhibited by the node 1108, and the cloud component 320 can search for a prewritten logic in the inner view logic repository 1201 that is linked, mapped, or associated to that same data type. In various cases, that prewritten logic can be referred to as an inner view node 1208.

Moreover, the cloud component 320 can iterate to the node 1110 in the tree hierarchy 1102. As above, introspection can cause the cloud component 320 to know whatever data type is exhibited by the node 1110, and the cloud component 320 can search for a prewritten logic in the inner view logic repository 1201 that is linked, mapped, or associated to that same data type. In various cases, that prewritten logic can be referred to as an inner view node 1210.

Furthermore, the cloud component 320 can iterate to the node 1112 in the tree hierarchy 1102. As above, introspection can cause the cloud component 320 to know whatever data type is exhibited by the node 1112, and the cloud component 320 can search for a prewritten logic in the inner view logic repository 1201 that is linked, mapped, or associated to that same data type. In various cases, that prewritten logic can be referred to as an inner view node 1212.

Similarly, the cloud component 320 can iterate to the node 1114 in the tree hierarchy 1102. As above, introspection can cause the cloud component 320 to know whatever data type is exhibited by the node 1114, and the cloud component 320 can search for a prewritten logic in the inner view logic repository 1201 that is linked, mapped, or associated to that same data type. In various cases, that prewritten logic can be referred to as an inner view node 1214.

In various aspects, the inner view nodes 1204-1214 can collectively be considered as forming the inner view tree hierarchy 1202. Note how the inner view tree hierarchy 1202 can be considered as being synchronized with or as otherwise having the same dependency structure as the tree hierarchy 1102. Such synchronization or symmetry can be considered as a result of the node-wise iteration performed by the cloud component 320. In various cases, the cloud component 320 can perform the opposite or inverse of code compilation or syntactic parsing on the inner view tree hierarchy 1202, which can yield the script for the inner view 514. In other words, the inner view tree hierarchy 1202 can be considered as indicating the internal organization or structure of the script of the inner view 514. In this way, the cloud component 320 can automatically generate the inner view 514 based on the tree hierarchy 1102.

Figure 13:
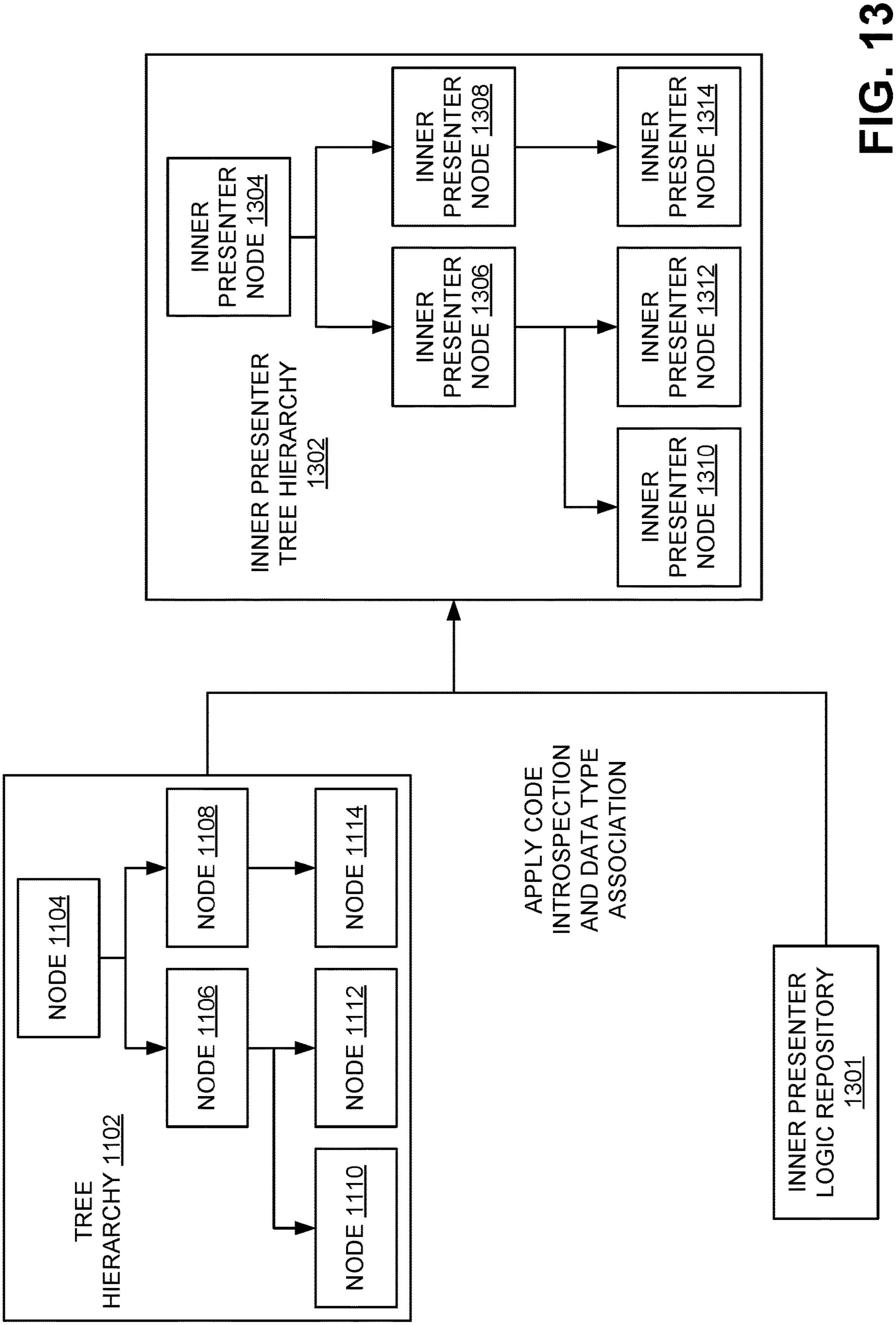

Now, consider FIG. 13. In various aspects, the cloud component 320 can electronically store, electronically maintain, or otherwise electronically access an inner presenter logic repository 1301. In various instances, the inner presenter logic repository 1301 can be any suitable list, set, group, or collection of prewritten logics, where each prewritten logic can be one or more lines of code that perform or facilitate any suitable universal functionality that is ordinarily, normally, or otherwise often associated with MVP presenters. In various cases, the inner presenter logic repository 1301 can be collated by data type. In other words, each prewritten logic in the inner presenter logic repository 1301 can be considered as being linked, mapped, or otherwise associated with a respective data type. In still other words, each prewritten logic in the inner presenter logic repository 1301 can be considered as being appropriately used for the presentation of a respective data type.

Just as above, the cloud component 320 can iteratively perform data type matching or association between the tree hierarchy 1102 and the inner presenter logic repository 1301. In various cases, such matching or association can incrementally generate an inner presenter tree hierarchy 1302.

For instance, the cloud component 320 can begin with the node 1104. Because of the above-described introspection, the cloud component 320 can know whatever data type that is exhibited by the node 1104. In various aspects, the cloud component 320 can search through the inner presenter logic repository 1301 for a prewritten logic that is linked, mapped, or associated to that same data type. In various cases, that prewritten logic can be referred to as an inner presenter node 1304.

Next, the cloud component 320 can iterate to the node 1106 in the tree hierarchy 1102. As above, introspection can cause the cloud component 320 to know whatever data type is exhibited by the node 1106, and the cloud component 320 can search for a prewritten logic in the inner presenter logic repository 1301 that is linked, mapped, or associated to that same data type. In various cases, that prewritten logic can be referred to as an inner presenter node 1306.

Likewise, the cloud component 320 can iterate to the node 1108 in the tree hierarchy 1102. Just as above, introspection can cause the cloud component 320 to know whatever data type is exhibited by the node 1108, and the cloud component 320 can search for a prewritten logic in the inner presenter logic repository 1301 that is linked, mapped, or associated to that same data type. In various cases, that prewritten logic can be referred to as an inner presenter node 1308.

Moreover, the cloud component 320 can iterate to the node 1110 in the tree hierarchy 1102. As above, introspection can cause the cloud component 320 to know whatever data type is exhibited by the node 1110, and the cloud component 320 can search for a prewritten logic in the inner presenter logic repository 1301 that is linked, mapped, or associated to that same data type. In various cases, that prewritten logic can be referred to as an inner presenter node 1310.

Furthermore, the cloud component 320 can iterate to the node 1112 in the tree hierarchy 1102. As above, introspection can cause the cloud component 320 to know whatever data type is exhibited by the node 1112, and the cloud component 320 can search for a prewritten logic in the inner presenter logic repository 1301 that is linked, mapped, or associated to that same data type. In various cases, that prewritten logic can be referred to as an inner presenter node 1312.

Similarly, the cloud component 320 can iterate to the node 1114 in the tree hierarchy 1102. As above, introspection can cause the cloud component 320 to know whatever data type is exhibited by the node 1114, and the cloud component 320 can search for a prewritten logic in the inner presenter logic repository 1301 that is linked, mapped, or associated to that same data type. In various cases, that prewritten logic can be referred to as an inner presenter node 1314.

In various aspects, the inner presenter nodes 1304-1314 can collectively be considered as forming the inner presenter tree hierarchy 1302. Note how the inner presenter tree hierarchy 1302 can be considered as being synchronized with or as otherwise having the same dependency structure as the tree hierarchy 1102. Such synchronization or symmetry can be considered as a result of the node-wise iteration performed by the cloud component 320. In various cases, the cloud component 320 can perform the opposite or inverse of code compilation or syntactic parsing on the inner presenter tree hierarchy 1302, which can yield the script for the inner presenter 512. In other words, the inner presenter tree hierarchy 1302 can be considered as indicating the internal organization or structure of the script of the inner presenter 512. In this way, the cloud component 320 can automatically generate the inner presenter 512 based on the tree hierarchy 1102.

Figure 14:
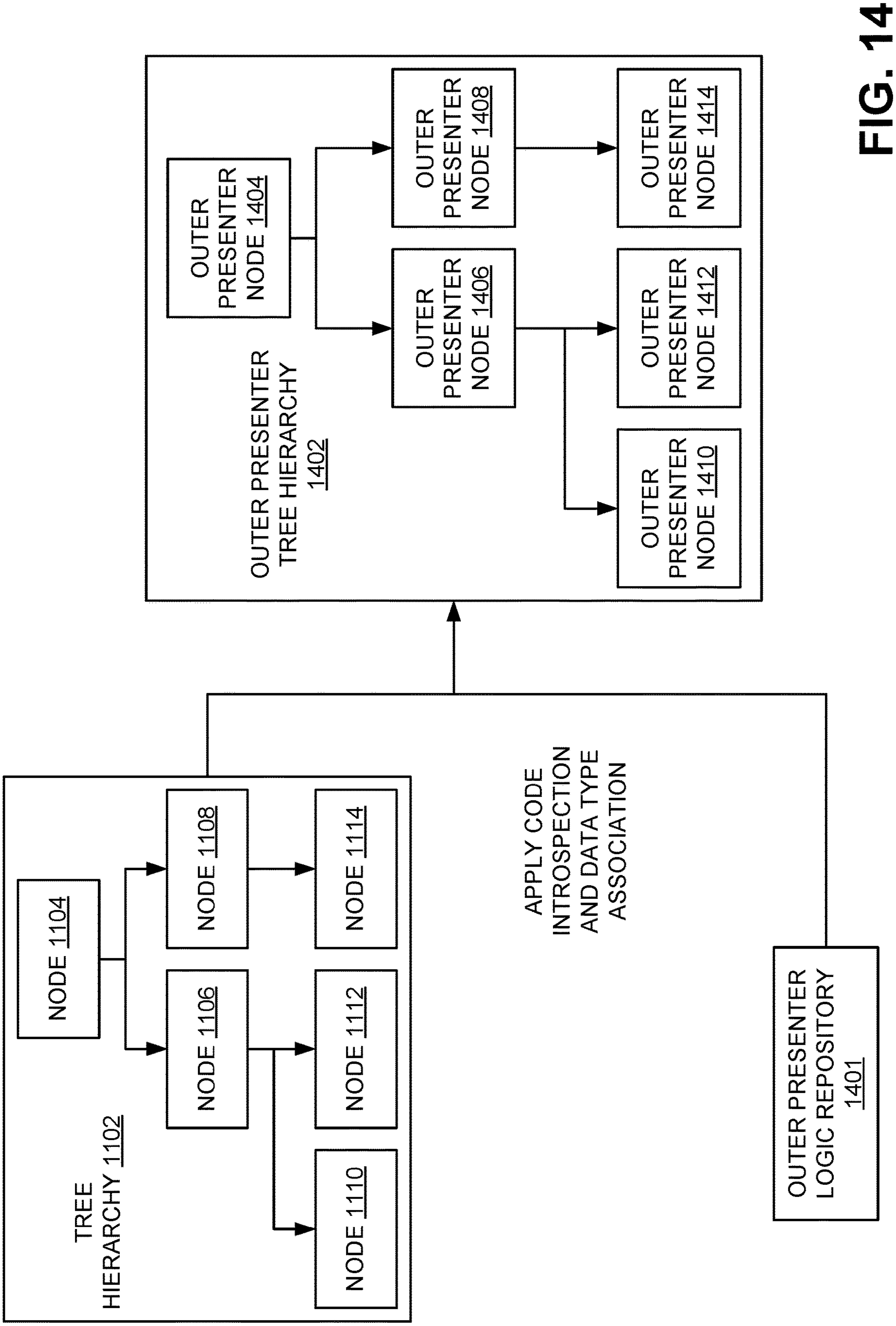

Now, consider FIG. 14. In various aspects, the cloud component 320 can electronically store, electronically maintain, or otherwise electronically access an outer presenter logic repository 1401. In various instances, the outer presenter logic repository 1401 can be any suitable list, set, group, or collection of prewritten logics, where each prewritten logic can be one or more lines of code that perform or facilitate any suitable universal functionality that is ordinarily, normally, or otherwise often associated with MVP presenters. In various cases, the outer presenter logic repository 1401 can be collated by data type. In other words, each prewritten logic in the outer presenter logic repository 1401 can be considered as being linked, mapped, or otherwise associated with a respective data type. In still other words, each prewritten logic in the outer presenter logic repository 1401 can be considered as being appropriately used for the presentation of a respective data type.

Just as above, the cloud component 320 can iteratively perform data type matching or association between the tree hierarchy 1102 and the outer presenter logic repository 1401. In various cases, such matching or association can incrementally generate an outer presenter tree hierarchy 1402.

For instance, the cloud component 320 can begin with the node 1104. Because of the above-described introspection, the cloud component 320 can know whatever data type that is exhibited by the node 1104. In various aspects, the cloud component 320 can search through the outer presenter logic repository 1401 for a prewritten logic that is linked, mapped, or associated to that same data type. In various cases, that prewritten logic can be referred to as an outer presenter node 1404.

Next, the cloud component 320 can iterate to the node 1106 in the tree hierarchy 1102. As above, introspection can cause the cloud component 320 to know whatever data type is exhibited by the node 1106, and the cloud component 320 can search for a prewritten logic in the outer presenter logic repository 1401 that is linked, mapped, or associated to that same data type. In various cases, that prewritten logic can be referred to as an outer presenter node 1406.

Likewise, the cloud component 320 can iterate to the node 1108 in the tree hierarchy 1102. Just as above, introspection can cause the cloud component 320 to know whatever data type is exhibited by the node 1108, and the cloud component 320 can search for a prewritten logic in the outer presenter logic repository 1401 that is linked, mapped, or associated to that same data type. In various cases, that prewritten logic can be referred to as an outer presenter node 1408.

Moreover, the cloud component 320 can iterate to the node 1110 in the tree hierarchy 1102. As above, introspection can cause the cloud component 320 to know whatever data type is exhibited by the node 1110, and the cloud component 320 can search for a prewritten logic in the outer presenter logic repository 1401 that is linked, mapped, or associated to that same data type. In various cases, that prewritten logic can be referred to as an outer presenter node 1410.

Furthermore, the cloud component 320 can iterate to the node 1112 in the tree hierarchy 1102. As above, introspection can cause the cloud component 320 to know whatever data type is exhibited by the node 1112, and the cloud component 320 can search for a prewritten logic in the outer presenter logic repository 1401 that is linked, mapped, or associated to that same data type. In various cases, that prewritten logic can be referred to as an outer presenter node 1412.

Similarly, the cloud component 320 can iterate to the node 1114 in the tree hierarchy 1102. As above, introspection can cause the cloud component 320 to know whatever data type is exhibited by the node 1114, and the cloud component 320 can search for a prewritten logic in the outer presenter logic repository 1401 that is linked, mapped, or associated to that same data type. In various cases, that prewritten logic can be referred to as an outer presenter node 1414.

In various aspects, the outer presenter nodes 1404-1414 can collectively be considered as forming the outer presenter tree hierarchy 1402. Note how the outer presenter tree hierarchy 1402 can be considered as being synchronized with or as otherwise having the same dependency structure as the tree hierarchy 1102. Such synchronization or symmetry can be considered as a result of the node-wise iteration performed by the cloud component 320. In various cases, the cloud component 320 can perform the opposite or inverse of code compilation or syntactic parsing on the outer presenter tree hierarchy 1402, which can yield the script for the outer presenter 504. In other words, the outer presenter tree hierarchy 1402 can be considered as indicating the internal organization or structure of the script of the outer presenter 504. In this way, the cloud component 320 can automatically generate the outer presenter 504 based on the tree hierarchy 1102.

Figure 15:
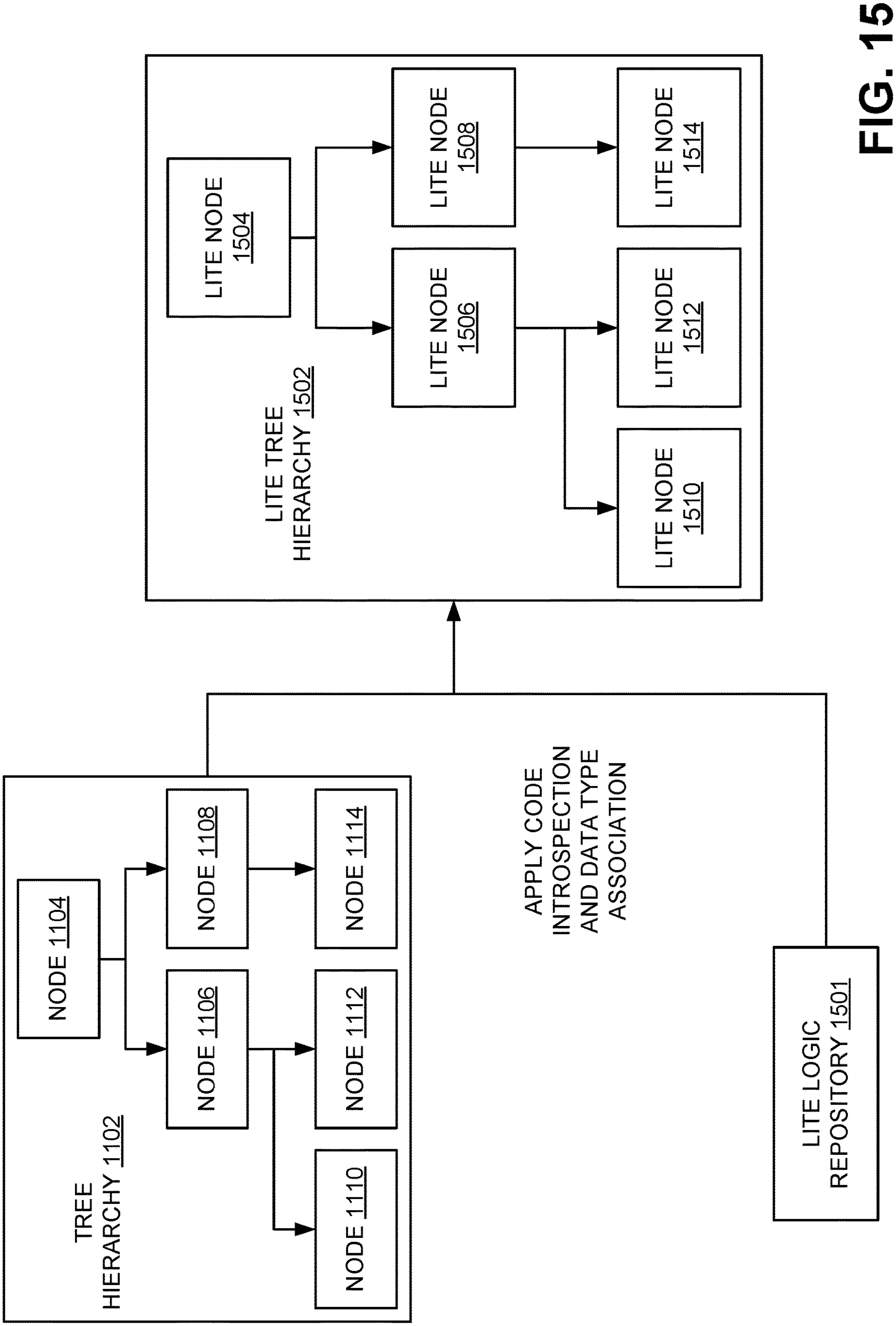

Now, consider FIG. 15. In various aspects, the cloud component 320 can electronically store, electronically maintain, or otherwise electronically access a lite logic repository 1501. In various instances, the lite logic repository 1501 can be any suitable list, set, group, or collection of prewritten logics, where each prewritten logic can be one or more lines of code that perform or facilitate any suitable universal functionality that is deemed to be associated with lite versions of desktop applications. In various cases, the lite logic repository 1501 can be collated by data type. In other words, each prewritten logic in the lite logic repository 1501 can be considered as being linked, mapped, or otherwise associated with a respective data type. In still other words, each prewritten logic in the lite logic repository 1501 can be considered as being appropriately used for the lite implementation of a respective data type.

Just as above, the cloud component 320 can iteratively perform data type matching or association between the tree hierarchy 1102 and the lite logic repository 1501. In various cases, such matching or association can incrementally generate a lite tree hierarchy 1502.

For instance, the cloud component 320 can begin with the node 1104. Because of the above-described introspection, the cloud component 320 can know whatever data type that is exhibited by the node 1104. In various aspects, the cloud component 320 can search through the lite logic repository 1501 for a prewritten logic that is linked, mapped, or associated to that same data type. In various cases, that prewritten logic can be referred to as a lite node 1504.

Next, the cloud component 320 can iterate to the node 1106 in the tree hierarchy 1102. As above, introspection can cause the cloud component 320 to know whatever data type is exhibited by the node 1106, and the cloud component 320 can search for a prewritten logic in the lite logic repository 1501 that is linked, mapped, or associated to that same data type. In various cases, that prewritten logic can be referred to as a lite node 1506.

Likewise, the cloud component 320 can iterate to the node 1108 in the tree hierarchy 1102. Just as above, introspection can cause the cloud component 320 to know whatever data type is exhibited by the node 1108, and the cloud component 320 can search for a prewritten logic in the lite logic repository 1501 that is linked, mapped, or associated to that same data type. In various cases, that prewritten logic can be referred to as a lite node 1508.

Moreover, the cloud component 320 can iterate to the node 1110 in the tree hierarchy 1102. As above, introspection can cause the cloud component 320 to know whatever data type is exhibited by the node 1110, and the cloud component 320 can search for a prewritten logic in the lite logic repository 1501 that is linked, mapped, or associated to that same data type. In various cases, that prewritten logic can be referred to as a lite node 1510.

Furthermore, the cloud component 320 can iterate to the node 1112 in the tree hierarchy 1102. As above, introspection can cause the cloud component 320 to know whatever data type is exhibited by the node 1112, and the cloud component 320 can search for a prewritten logic in the lite logic repository 1501 that is linked, mapped, or associated to that same data type. In various cases, that prewritten logic can be referred to as a lite node 1512.

Similarly, the cloud component 320 can iterate to the node 1114 in the tree hierarchy 1102. As above, introspection can cause the cloud component 320 to know whatever data type is exhibited by the node 1114, and the cloud component 320 can search for a prewritten logic in the lite logic repository 1501 that is linked, mapped, or associated to that same data type. In various cases, that prewritten logic can be referred to as a lite node 1514.

In various aspects, the lite nodes 1504-1514 can collectively be considered as forming the lite tree hierarchy 1502. Note how the lite tree hierarchy 1502 can be considered as being synchronized with or as otherwise having the same dependency structure as the tree hierarchy 1102. Such synchronization or symmetry can be considered as a result of the node-wise iteration performed by the cloud component 320. In various cases, the cloud component 320 can perform the opposite or inverse of code compilation or syntactic parsing on the lite tree hierarchy 1502, which can yield the script for the lite desktop application 510. In other words, the lite tree hierarchy 1502 can be considered as indicating the internal organization or structure of the script of the lite desktop application 510. In this way, the cloud component 320 can automatically generate the lite desktop application 510 based on the tree hierarchy 1102.

Note that, in various embodiments, lite logic repository 1501 can be omitted, and the cloud component 320 can generate the lite tree hierarchy 1502 by pruning or trimming the tree hierarchy 1102. As a non-limiting example, the lite tree hierarchy 1502 can be initially empty, and the cloud component 320 can iterate through each node of the tree hierarchy 1102. For each node of the tree hierarchy 1102, the cloud component 320 can decide whether to include a duplicate of that node in the lite tree hierarchy 1502 or whether to omit that node from the lite tree hierarchy 1502. In various cases, the cloud component 320 can make such decision or determination on the basis of the introspected data type of that node. For instance, if the introspected data type of that node indicates that the node pertains to an underlying, substantive, or computationally-intensive algorithm of the desktop application 302, then the cloud component 320 can omit that node from the lite tree hierarchy 1502. Instead, if the introspected data type of that node indicates that the node does not pertain to an underlying, substantive, or computationally-intensive algorithm of the desktop application 302, then the cloud component 320 can include or insert that node in the lite tree hierarchy 1502.

In any case, by leveraging automated operations such as code compilation, syntactic parsing, code introspection, and data type matching (e.g., any of which can be facilitated or initiated by preprocessor directives), the cloud component 320 can automatically generate the nested MVP architecture 402, based on the desktop application 302. In various cases, such automatic generation can be considered beneficial, since whichever engineers were responsible for writing or debugging the desktop application 302 need not have worried or been distracted with manually coding or creating the nested MVP architecture 402.

Although the herein disclosure mainly describes the desktop application 302 as pertaining to or otherwise being associated with the scientific instrument 304, this is a mere non-limiting example for ease of illustration and explanation. In various cases, various embodiments described herein can be extrapolated or applied to any suitable desktop applications, even to desktop applications that do not pertain to scientific instruments.

Figure 17:
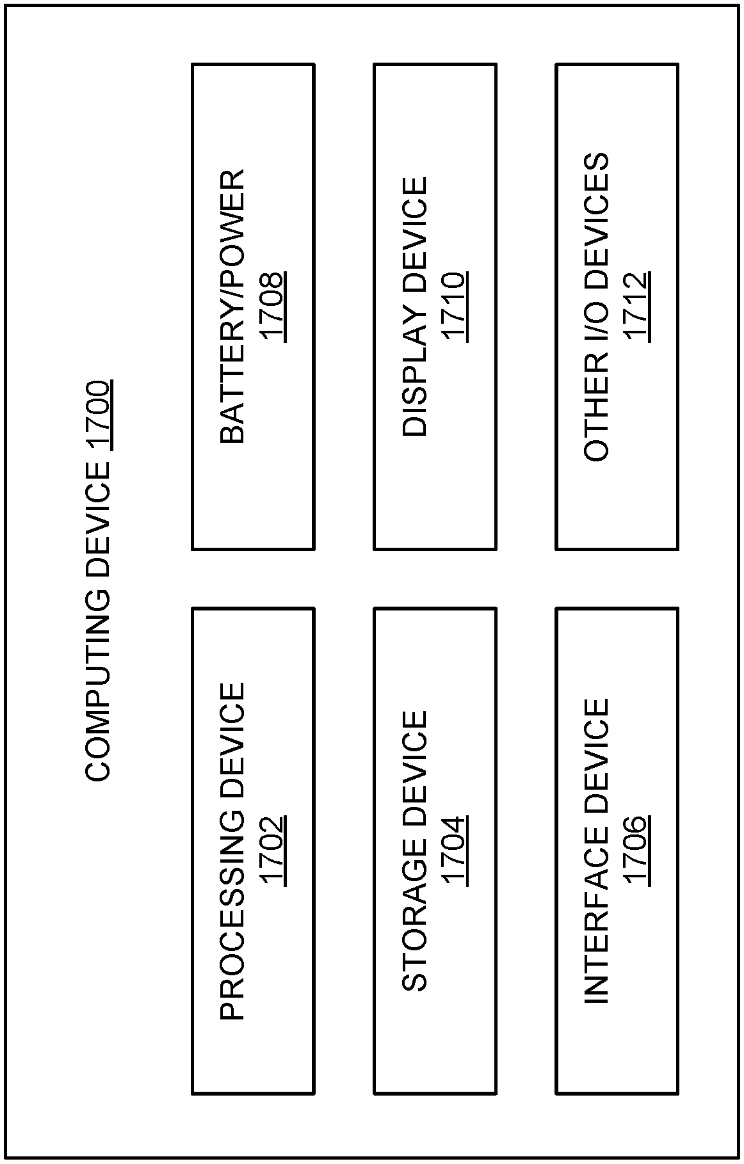
FIG. 17 illustrates an example, non-limiting block diagram of a computing device that can perform some or all of the methods or techniques disclosed herein, in accordance with various embodiments described herein.
Figure 18:
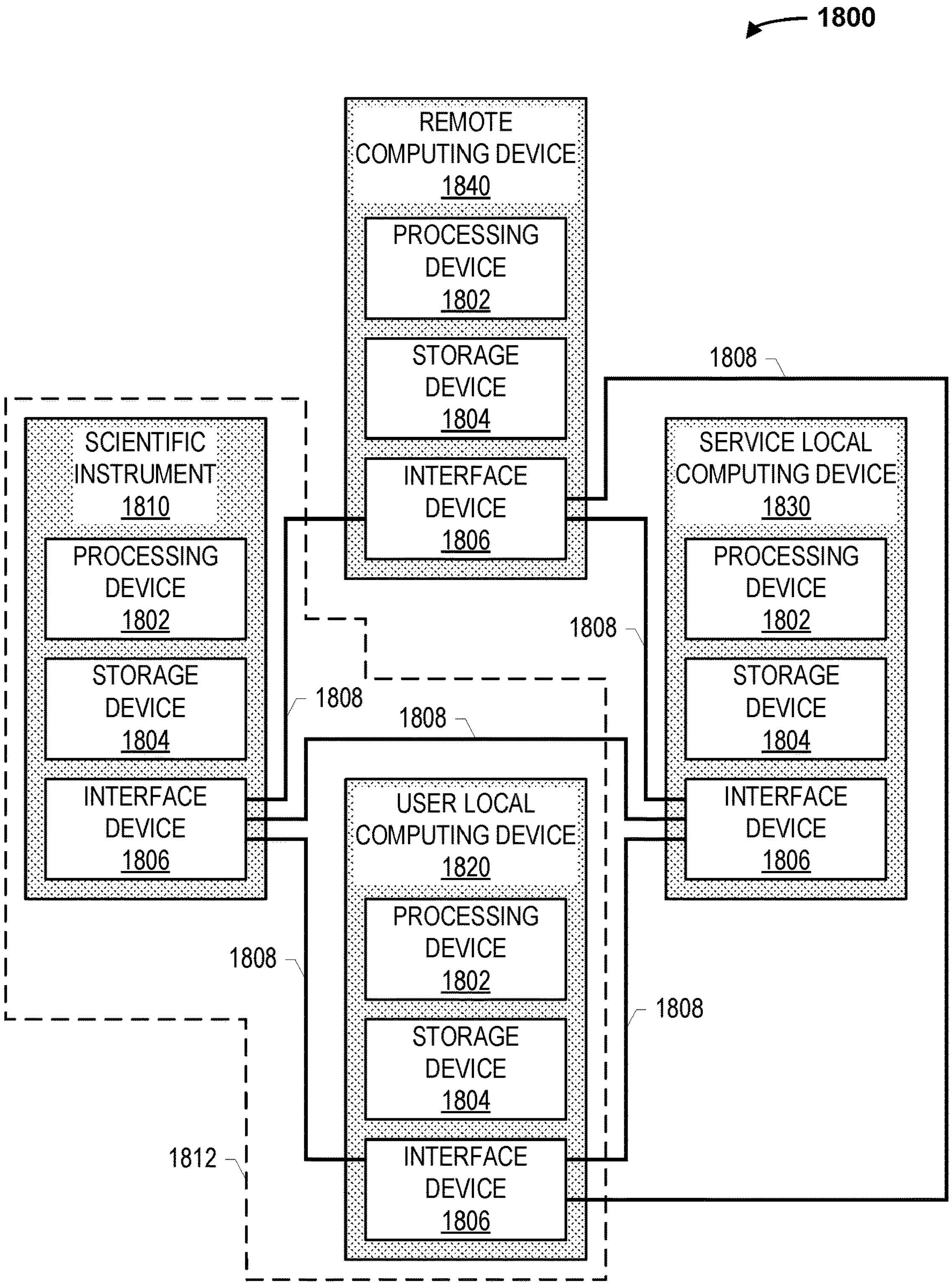
FIG. 18 illustrates an example, non-limiting block diagram of a scientific instrument support system in which some or all of the methods or techniques disclosed herein may be performed, in accordance with various embodiments described herein.

The scientific instrument systems, methods, or techniques disclosed herein may include interactions with a human user (e.g., via a user local computing device 1820 discussed herein with reference to FIG. 18). These interactions may include providing information to the user (e.g., information regarding the operation of a scientific instrument such as the scientific instrument 1810 of FIG. 18, information regarding a sample being analyzed or other test or measurement performed by a scientific instrument, information retrieved from a local or remote database, or other information) or providing an option for a user to input commands (e.g., to control the operation of a scientific instrument such as the scientific instrument 1810 of FIG. 18, or to control the analysis of data generated by a scientific instrument), queries (e.g., to a local or remote database), or other information. In some embodiments, these interactions may be performed through a graphical user interface (GUI) that includes a visual display on a display device (e.g., a display device 1710 discussed herein with reference to FIG. 17) that provides outputs to the user and/or prompts the user to provide inputs (e.g., via one or more input devices, such as a keyboard, mouse, trackpad, or touchscreen, included in other I/O devices 1712 discussed herein with reference to FIG. 17). The scientific instrument systems, methods, or techniques disclosed herein may include any suitable GUIs for interaction with a user.

Figure 16:
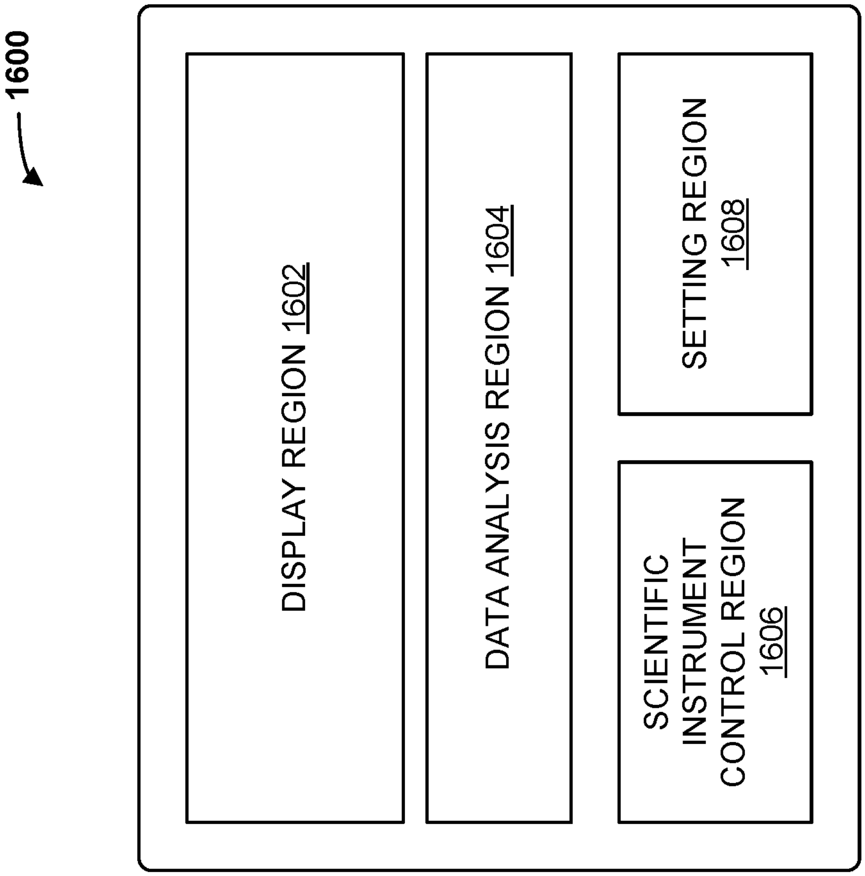
FIG. 16 illustrates an example, non-limiting block diagram of a graphical user interface that can be used in the performance of some or all of the methods or techniques disclosed herein, in accordance with various embodiments described herein.

FIG. 16 depicts an example graphical user interface 1600 (hereafter "GUI 1600") that can be used in the performance of some or all of the support methods or techniques disclosed herein, in accordance with various embodiments. In various aspects, the GUI 1600 can be provided on any suitable electronic display (e.g., a display device 1710 discussed herein with reference to FIG. 17) of a computing device (e.g., a computing device 1700 discussed herein with reference to FIG. 17) of a scientific instrument support system (e.g., a scientific instrument support system 1800 discussed herein with reference to FIG. 18), and a user or technician can interact with the GUI 1600 using any suitable input device (e.g., any of other I/O devices 1712 discussed herein with reference to FIG. 17) and input technique (e.g., movement of a cursor, motion capture, facial recognition, gesture detection, voice recognition, actuation of buttons).

The GUI 1600 can include a data display region 1602, a data analysis region 1604, a scientific instrument control region 1606, and a setting region 1608. The particular number and arrangement of regions depicted in FIG. 16 is merely illustrative, and any number and arrangement of regions, including any desired features, can be included in other embodiments of the GUI 1600.

The data display region 1602 can display data generated by a scientific instrument (e.g., a scientific instrument 1810 discussed herein with reference to FIG. 18).

The data analysis region 1604 can display any suitable data analysis results (e.g., the results of analyzing the data illustrated in the data display region 1602 or other data). In some embodiments, the data display region 1602 and the data analysis region 1604 can be combined in the GUI 1600 (e.g., to include both data output from a scientific instrument and some analysis of the data in a common graph or region).

The scientific instrument control region 1606 can include options that allow a user or technician to control a scientific instrument (e.g., the scientific instrument 1810 discussed herein with reference to FIG. 18). For example, the scientific instrument control region 1606 can include configurable parameters that govern operation of such scientific instrument (e.g., configurable parameters that govern voltages or electric currents of the scientific instrument, that govern interior temperatures of the scientific instrument, or that govern fluid flow rates of the scientific instrument).

The setting region 1608 can include options that allow a user or technician to control any features or functions of the GUI 1600 (or of other GUIs) or to perform common computing operations with respect to the data display region 1602 and the data analysis region 1604 (e.g., saving data on a storage device, such as the storage device 1704 discussed herein with reference to FIG. 17, sending data to another user, labeling data).

As noted above, the scientific instrument module 102 can be implemented by one or more computing devices. FIG. 17 is a block diagram of a computing device 1700 that can perform some or all of the scientific instrument methods or techniques disclosed herein, in accordance with various embodiments. In some embodiments, the scientific instrument module 102 can be implemented by a single instance of the computing device 1700 or by multiple instances of the computing device 1700. Further, as discussed below, the computing device 1700 (or multiple instances thereof) that implements the scientific instrument module 102 can be part of one or more of a scientific instrument 1810, a user local computing device 1820, a service local computing device 1830, or a remote computing device 1840 of FIG. 18.

The computing device 1700 is illustrated as having a number of components, but any one or more of these components can be omitted or duplicated, as suitable for the application and setting. In some embodiments, some or all of the components included in the computing device 1700 can be attached to one or more motherboards and enclosed in a housing (e.g., including plastic, metal, or other materials). In some embodiments, some these components can be fabricated onto a single system-on-a-chip (SoC) (e.g., an SoC may include one or more instances of a processing device 1702 and one or more instances of a storage device 1704). Additionally, in various embodiments, the computing device 1700 can omit one or more of the components illustrated in FIG. 17, but can include interface circuitry (not shown) for coupling to the one or more omitted components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 1700 can omit a display device 1710, but can include display device interface circuitry (e.g., a connector and driver circuitry) to which a display device 1710 can be coupled.

The computing device 1700 can include a processing device 1702 (e.g., one or more processing devices). As used herein, the term "processing device" can refer to any device or portion of a device that processes electronic data from registers or memory to transform that electronic data into other electronic data that may be stored in registers or memories. The processing device 1702 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 1700 can include a storage device 1704 (e.g., one or more storage devices). The storage device 1704 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 1704 can include memory that shares a die with a processing device 1702. In such an embodiment, the memory may be used as cache memory and may include embedded dynamic random access memory (eDRAM) or spin transfer torque magnetic random access memory (STT-MRAM), for example. In some embodiments, the storage device 1704 can include non-transitory computer readable media having instructions thereon that, when executed by one or more processing devices (e.g., the processing device 1702), cause the computing device 1700 to perform any appropriate ones of or portions of the methods disclosed herein.

The computing device 1700 can include an interface device 1706 (e.g., one or more instances of the interface device 1706). The interface device 1706 can include one or more communication chips, connectors, or other hardware and software to govern communications between the computing device 1700 and other computing devices. For example, the interface device 1706 can include circuitry for managing wireless communications for the transfer of data to and from the computing device 1700. The term "wireless" and its derivatives may be used to describe circuits, devices, systems, methods, techniques, or communications channels that may communicate data through the use of modulated electromagnetic radiation through a nonsolid medium. The term does not imply that the associated devices do not contain any wires, although in some embodiments they might not. Circuitry included in the interface device 1706 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2")). In some embodiments, circuitry included in the interface device 1706 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 1706 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 1706 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 1706 may include one or more antennas (e.g., one or more antenna arrays) to receipt and/or transmission of wireless communications.

In some embodiments, the interface device 1706 can include circuitry for managing wired communications, such as electrical, optical, or any other suitable communication protocols. For example, the interface device 1706 can include circuitry to support communications in accordance with Ethernet technologies. In some embodiments, the interface device 1706 can support both wireless and wired communication, or can support multiple wired communication protocols or multiple wireless communication protocols. For example, a first set of circuitry of the interface device 1706 may be dedicated to shorter-range wireless communications such as Wi-Fi or Bluetooth, and a second set of circuitry of the interface device 1706 may be dedicated to longer-range wireless communications such as global positioning system (GPS), EDGE, GPRS, CDMA, WiMAX, LTE, EV-DO, or others. In some embodiments, a first set of circuitry of the interface device 1706 can be dedicated to wireless communications, and a second set of circuitry of the interface device 1706 can be dedicated to wired communications.

The computing device 1700 can include battery/power circuitry 1708. The battery/power circuitry 1708 can include one or more energy storage devices (e.g., batteries or capacitors) or circuitry for coupling components of the computing device 1700 to an energy source separate from the computing device 1700 (e.g., alternating current line power).

The computing device 1700 can include a display device 1710 (e.g., multiple display devices). The display device 1710 can include any visual indicators, such as a heads-up display, a computer monitor, a projector, a touchscreen display, a liquid crystal display (LCD), a light-emitting diode display, or a flat panel display.

The computing device 1700 can include other input/output (I/O) devices 1712. The other I/O devices 1712 can include one or more audio output devices (e.g., speakers, headsets, earbuds, alarms), one or more audio input devices (e.g., microphones or microphone arrays), location devices (e.g., GPS devices in communication with a satellite-based system to receive a location of the computing device 1700), audio codecs, video codecs, printers, sensors (e.g., thermocouples or other temperature sensors, humidity sensors, pressure sensors, vibration sensors, accelerometers, gyroscopes), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 1700 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer), a desktop computing device, or a server computing device or other networked computing component.

One or more computing devices implementing any of the scientific instrument modules, methods, or techniques disclosed herein may be part of a scientific instrument support system. FIG. 18 is a block diagram of an example scientific instrument support system 1800 in which some or all of the scientific instrument support methods disclosed herein may be performed, in accordance with various embodiments. The scientific instrument modules, methods, or techniques disclosed herein (e.g., the scientific instrument module 102, the computer-implemented method 200, the system 312, the computer-implemented methods 800-1000) can be implemented by one or more of a scientific instrument 1810, a user local computing device 1820, a service local computing device 1830, or a remote computing device 1840 of the scientific instrument support system 1800.

Any of the scientific instrument 1810, the user local computing device 1820, the service local computing device 1830, or the remote computing device 1840 can include any of the embodiments of the computing device 1700, and any of the scientific instrument 1810, the user local computing device 1820, the service local computing device 1830, or the remote computing device 1840 can take the form of any appropriate ones of the embodiments of the computing device 1700.

The scientific instrument 1810, the user local computing device 1820, the service local computing device 1830, or the remote computing device 1840 may each include a processing device 1802, a storage device 1804, and an interface device 1806. The processing device 1802 may take any suitable form, including any form of the processing device 1702, and the processing devices 1802 included in different ones of the scientific instrument 1810, the user local computing device 1820, the service local computing device 1830, or the remote computing device 1840 may take the same form or different forms. The storage device 1804 may take any suitable form, including any form of the storage device 1704, and the storage devices 1804 included in different ones of the scientific instrument 1810, the user local computing device 1820, the service local computing device 1830, or the remote computing device 1840 may take the same form or different forms. The interface device 1806 may take any suitable form, including any form of the interface device 1706, and the interface devices 1806 included in different ones of the scientific instrument 1810, the user local computing device 1820, the service local computing device 1830, or the remote computing device 1840 may take the same form or different forms.

The scientific instrument 1810, the user local computing device 1820, the service local computing device 1830, and the remote computing device 1840 can be in communication with other elements of the scientific instrument support system 1800 via communication pathways 1808. The communication pathways 1808 may communicatively couple the interface devices 1806 of different ones of the elements of the scientific instrument support system 1800, as shown, and may be wired or wireless communication pathways (e.g., in accordance with any of the communication techniques discussed herein with reference to the interface device 1706). The particular scientific instrument support system 1800 depicted in FIG. 18 includes communication pathways between each pair of the scientific instrument 1810, the user local computing device 1820, the service local computing device 1830, and the remote computing device 1840, but this "fully connected" implementation is merely illustrative, and in various embodiments, various ones of the communication pathways 1808 may be absent. For example, in some embodiments, a service local computing device 1830 can lack a direct communication pathway 1808 between its interface device 1806 and the interface device 1806 of the scientific instrument 1810, but can instead communicate with the scientific instrument 1810 via the communication pathway 1808 between the service local computing device 1830 and the user local computing device 1820 and the communication pathway 1808 between the user local computing device 1820 and the scientific instrument 1810.

The scientific instrument 1810 may include any appropriate scientific instrument, such as the scientific instrument 304.

The user local computing device 1820 can be a computing device (e.g., in accordance with any of the embodiments of the computing device 1700) that is local to a user of the scientific instrument 1810. In some embodiments, the user local computing device 1820 may also be local to the scientific instrument 1810, but this need not be the case; for example, a user local computing device 1820 that is in a user's home or office may be remote from, but in communication with, the scientific instrument 1810 so that the user may use the user local computing device 1820 to control or access data from the scientific instrument 1810. In some embodiments, the user local computing device 1820 may be a laptop, smartphone, or tablet device. In some embodiments the user local computing device 1820 can be a portable computing device.

The service local computing device 1830 can be a computing device (e.g., in accordance with any of the embodiments of the computing device 1700) that is local to an entity that services the scientific instrument 1810. For example, the service local computing device 1830 may be local to a manufacturer of the scientific instrument 1810 or to a third-party service company. In some embodiments, the service local computing device 1830 can communicate with the scientific instrument 1810, the user local computing device 1820, or the remote computing device 1840 (e.g., via a direct communication pathway 1808 or via multiple "indirect" communication pathways 1808, as discussed above) to receive data regarding the operation of the scientific instrument 1810, the user local computing device 1820, or the remote computing device 1840 (e.g., the results of self-tests of the scientific instrument 1810, calibration coefficients used by the scientific instrument 1810, the measurements of sensors associated with the scientific instrument 1810). In some embodiments, the service local computing device 1830 may communicate with the scientific instrument 1810, the user local computing device 1820, or the remote computing device 1840 (e.g., via a direct communication pathway 1808 or via multiple "indirect" communication pathways 1808, as discussed above) to transmit data to the scientific instrument 1810, the user local computing device 1820, or the remote computing device 1840 (e.g., to update programmed instructions, such as firmware, in the scientific instrument 1810, to initiate the performance of test or calibration sequences in the scientific instrument 1810, to update programmed instructions, such as software, in the user local computing device 1820 or the remote computing device 1840). A user of the scientific instrument 1810 can utilize the scientific instrument 1810 or the user local computing device 1820 to communicate with the service local computing device 1830 to report a problem with the scientific instrument 1810 or the user local computing device 1820, to request a visit from a technician to improve the operation of the scientific instrument 1810, to order consumables or replacement parts associated with the scientific instrument 1810, or for other purposes.

The remote computing device 1840 can be a computing device (e.g., in accordance with any of the embodiments of the computing device 1700 discussed herein) that is remote from the scientific instrument 1810 or from the user local computing device 1820. In some embodiments, the remote computing device 1840 can be included in a datacenter or other large-scale server environment. In some embodiments, the remote computing device 1840 may include network-attached storage (e.g., as part of the storage device 1804). The remote computing device 1840 can store data generated by the scientific instrument 1810, perform analyses of the data generated by the scientific instrument 1810 (e.g., in accordance with programmed instructions), facilitate communication between the user local computing device 1820 and the scientific instrument 1810, or facilitate communication between the service local computing device 1830 and the scientific instrument 1810.

In some embodiments, one or more of the elements of the scientific instrument support system 1800 illustrated in FIG. 18 can be omitted. Further, in some embodiments, multiple ones of various ones of the elements of the scientific instrument support system 1800 of FIG. 18 may be present. For example, a scientific instrument support system 1800 can include multiple user local computing devices 1820 (e.g., different user local computing devices 1820 associated with different users or in different locations). In another example, a scientific instrument support system 1800 may include multiple scientific instruments 1810, all in communication with service local computing device 1830 and/or a remote computing device 1840; in such an embodiment, the service local computing device 1830 may monitor these multiple scientific instruments 1810, and the service local computing device 1830 may cause updates or other information may be "broadcast" to multiple scientific instruments 1810 at the same time. Different ones of the scientific instruments 1810 in a scientific instrument support system 1800 can be located close to one another (e.g., in the same room) or farther from one another (e.g., on different floors of a building, in different buildings, in different cities, etc.). In some embodiments, a scientific instrument 1810 can be connected to an Internet-of-Things (IoT) stack that allows for command and control of the scientific instrument 1810 through a web-based application, a virtual or augmented reality application, a mobile application, or a desktop application. Any of these applications can be accessed by a user operating the user local computing device 1820 in communication with the scientific instrument 1810 by the intervening remote computing device 1840. In some embodiments, a scientific instrument 1810 may be sold by the manufacturer along with one or more associated user local computing devices 1820 as part of a local scientific instrument computing unit 1812.

In some embodiments, different ones of the scientific instruments 1810 included in a scientific instrument support system 1800 may be different types of scientific instruments 1810; for example, one scientific instrument 1810 may be a mass spectrometer, while another scientific instrument 1810 may be a chromatograph or autosampler. In some such embodiments, the remote computing device 1840 or the user local computing device 1820 can combine data from different types of scientific instruments 1810 included in a scientific instrument support system 1800.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)$=confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 19:
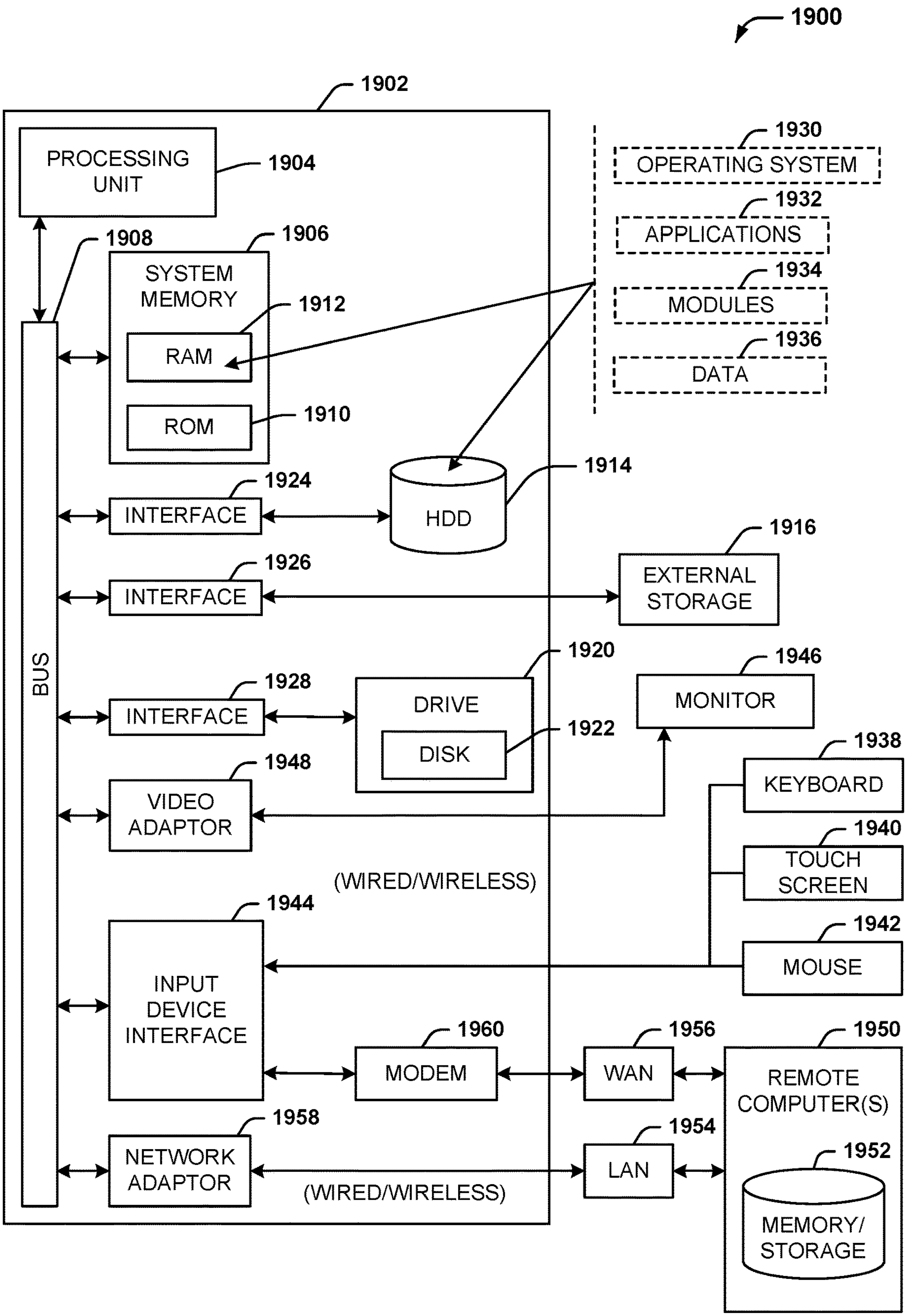
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
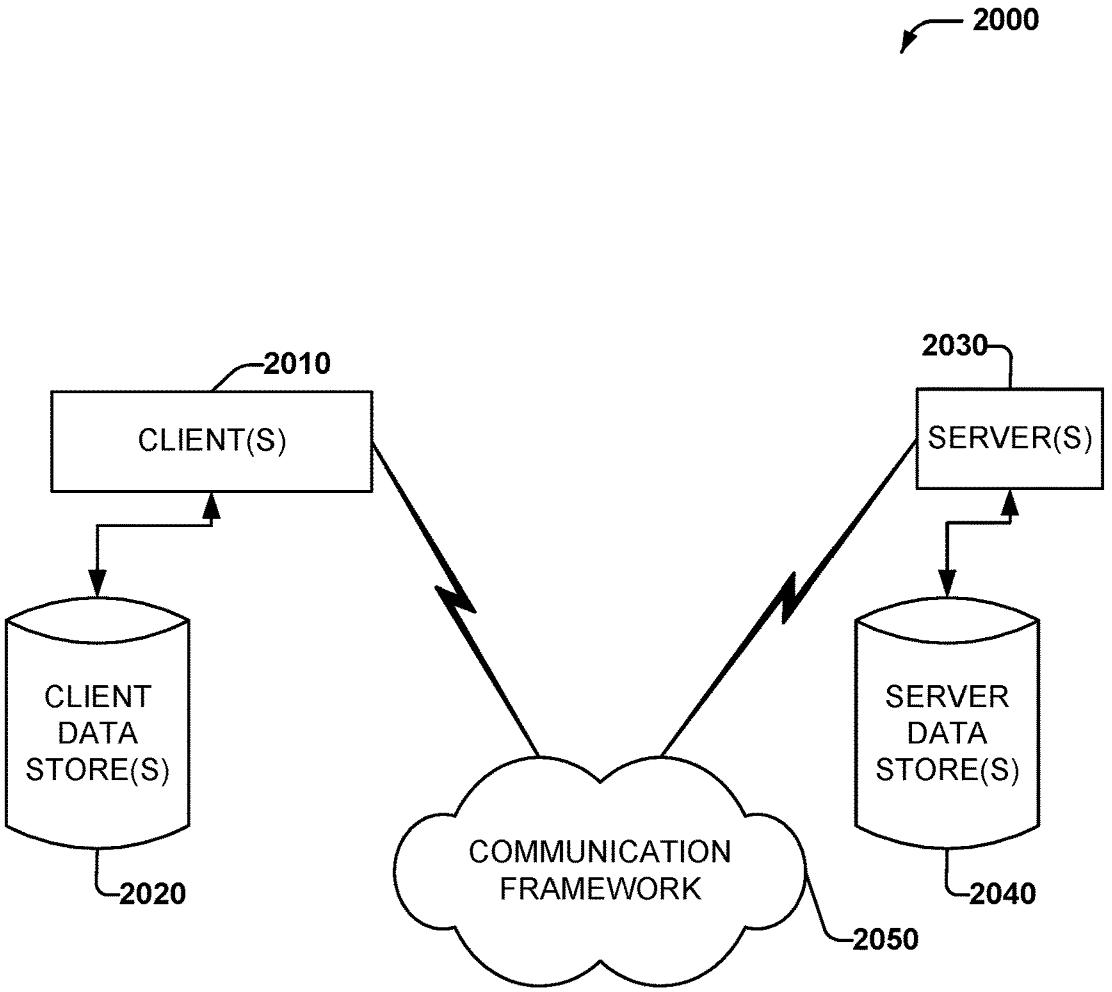
FIG. 20 illustrates an example networking environment operable to execute various implementations described herein.

FIG. 20 is a schematic block diagram of a sample computing environment 2000 with which the disclosed subject matter can interact. The sample computing environment 2000 includes one or more client(s) 2010. The client(s) 2010 can be hardware or software (e.g., threads, processes, computing devices). The sample computing environment 2000 also includes one or more server(s) 2030. The server(s) 2030 can also be hardware or software (e.g., threads, processes, computing devices). The servers 2030 can house threads to perform transformations by employing one or more embodiments as described herein, for example. One possible communication between a client 2010 and a server 2030 can be in the form of a data packet adapted to be transmitted between two or more computer processes. The sample computing environment 2000 includes a communication framework 2050 that can be employed to facilitate communications between the client(s) 2010 and the server(s) 2030. The client(s) 2010 are operably connected to one or more client data store(s) 2020 that can be employed to store information local to the client(s) 2010. Similarly, the server (s) 2030 are operably connected to one or more server data store(s) 2040 that can be employed to store information local to the servers 2030.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects are described in the following examples.

EXAMPLE 1: A system can comprise: a processor that executes computer-executable components stored in a non-transitory computer-readable memory, wherein the computer-executable components comprise: an access component that can access a desktop application; and a cloud component that can deploy the desktop application in a cloud computing environment, based on generating a nested model-view-presenter software architecture that treats the desktop application as an outer data model.

EXAMPLE 2: The system of any preceding example can be implemented, wherein the cloud component generates the nested model-view-presenter software architecture by: identifying, via code compilation or syntactic parsing facilitated by one or more first preprocessor directives, a tree hierarchy of the desktop application; and synthesizing, via code introspection and data type association facilitated by one or more second preprocessor directives, corresponding portions of the nested model-view-presenter software architecture based on the tree hierarchy.

EXAMPLE 3: The system of any preceding example can be implemented, wherein the cloud computing environment can comprise a server device and a client device, wherein the server device can host the desktop application and a portion of an outer presenter, and wherein the client device can host another portion of the outer presenter and an outer view.

EXAMPLE 4: The system of any preceding example can be implemented, wherein the outer view can comprise an inner view, an inner presenter, and a lite version of the desktop application.

EXAMPLE 5: The system of any preceding example can be implemented, wherein the client device can compile the inner view, the inner presenter, and the lite version of the desktop application via WebAssembly.

EXAMPLE 6: The system of any preceding example can be implemented, wherein the lite version of the desktop application can include metadata of the desktop application and resultant data outputted by the desktop application.

EXAMPLE 7: The system of any preceding example can be implemented, wherein the lite version of the desktop application can exclude underlying data computation algorithms of the desktop application.

EXAMPLE 8: The system of any preceding example can be implemented, wherein the lite version of the desktop application can include data exploration tools of the desktop application.

In various embodiments, any combination or combinations of examples 1-8 can be implemented.

EXAMPLE 9: A computer-implemented method can comprise accessing, by a device operatively coupled to a processor, a desktop application; and deploying, by the device, the desktop application in a cloud computing environment, based on generating a nested model-view-presenter software architecture that treats the desktop application as an outer data model.

EXAMPLE 10: The computer-implemented method of any preceding example can be implemented, wherein the device generates the nested model-view-presenter software architecture by: identifying, by the device and via code compilation or syntactic parsing facilitated by one or more first preprocessor directives, a tree hierarchy of the desktop application; and synthesizing, by the device and via code introspection and data type association facilitated by one or more second preprocessor directives, corresponding portions of the nested model-view-presenter software architecture based on the tree hierarchy.

EXAMPLE 11: The computer-implemented method of any preceding example can be implemented, wherein the cloud computing environment can comprise a server device and a client device, wherein the server device can host the desktop application and a portion of an outer presenter, and wherein the client device can host another portion of the outer presenter and an outer view.

EXAMPLE 12: The computer-implemented method of any preceding example can be implemented, wherein the outer view can comprise an inner view, an inner presenter, and a lite version of the desktop application.

EXAMPLE 13: The computer-implemented method of any preceding example can be implemented, wherein the client device can compile the inner view, the inner presenter, and the lite version of the desktop application via WebAssembly.

EXAMPLE 14: The computer-implemented method of any preceding example can be implemented, wherein the lite version of the desktop application can include metadata of the desktop application and resultant data outputted by the desktop application.

EXAMPLE 15: The computer-implemented method of any preceding example can be implemented, wherein the lite version of the desktop application can exclude underlying data computation algorithms of the desktop application.

EXAMPLE 16: The computer-implemented method of any preceding example can be implemented, wherein the lite version of the desktop application can include data exploration tools of the desktop application.

In various embodiments, any combination or combinations of examples 9-16 can be implemented.

EXAMPLE 17: A computer program product for facilitating desktop-to-cloud application migration can comprise a non-transitory computer-readable memory having program instructions embodied therewith. In various aspects, the program instructions can be executable by a processor to cause the processor to: access a computer program; identify, via code compilation or syntactic parsing facilitated by one or more first preprocessor directives, a tree hierarchy of the computer program; and deploy the computer program in a nested model-view-presenter software architecture that is derived, via code introspection and data type association facilitated by one or more second preprocessor directives, from the tree hierarchy.

EXAMPLE 18: The computer program product of any preceding example can be implemented, wherein the nested model-view-presenter software architecture comprises: the computer program and a portion of an outer presenter hosted by a server device; and a remaining portion of the outer presenter and an outer view hosted by a client device, wherein the outer view comprises an inner view, an inner presenter, and a lite version of the computer program.

EXAMPLE 19: The computer program product of any preceding example can be implemented, wherein the client device can compile the remaining portion of the outer presenter and the outer view in WebAssembly.

EXAMPLE 20: The computer program product of any preceding example can be implemented, wherein the lite version of the computer program can include metadata of the computer program and resultant data outputted by the computer program, and wherein the lite version of the computer program can exclude underlying data computation algorithms of the computer program.

In various embodiments, any combination or combinations of examples 17-20 can be implemented.

In various embodiments, any combination or combinations of examples 1-20 can be implemented.

What is claimed is:

1. A system, comprising:

a memory configured to store computer-executable components; and a processor that executes at least one of the computer-executable components that:

accesses a desktop application;

generates a nested model-view-presenter software architecture; and deploys the desktop application in a cloud computing environment, based on generating the nested model-view-presenter software architecture that treats the desktop application as an outer data model, wherein the cloud computing environment comprises a server device and a client device, wherein the server device hosts the desktop application and a portion of an outer presenter, wherein the client device hosts another portion of the outer presenter and an outer view, and wherein the outer view comprises an inner view, an inner presenter, and a lite version of the desktop application.

2. The system of claim 1, wherein the at least one of the computer-executable components generates the nested model-view-presenter software architecture by:

identifying, via code compilation or syntactic parsing facilitated by one or more first preprocessor directives, a tree hierarchy of the desktop application; and synthesizing, via code introspection and data type association facilitated by one or more second preprocessor directives, corresponding portions of the nested model-view-presenter software architecture based on the tree hierarchy of the desktop application.

3. The system of claim 1, wherein the client device compiles the inner view, the inner presenter, and the lite version of the desktop application via Web Assembly.

4. The system of claim 1, wherein the lite version of the desktop application includes metadata of the desktop application and resultant data outputted by the desktop application.

5. The system of claim 1, wherein the lite version of the desktop application excludes underlying data computation algorithms of the desktop application.

6. The system of claim 1, wherein the lite version of the desktop application includes data exploration tools of the desktop application.

7. The system of claim 1, wherein the desktop application is associated with a scientific instrument.

8. A computer-implemented method, comprising:

accessing, by a system operatively coupled to a processor, a desktop application;

generating, by the system, a nested model-view-presenter software architecture; and deploying, by the system, the desktop application in a cloud computing environment, based on generating the nested model-view-presenter software architecture that treats the desktop application as an outer data model, wherein the cloud computing environment comprises a server device and a client device, wherein the server device hosts the desktop application and a portion of an outer presenter, wherein the client device hosts another portion of the outer presenter and an outer view, and wherein the outer view comprises an inner view, an inner presenter, and a lite version of the desktop application.

9. The computer-implemented method of claim 8, wherein generating the nested model-view-presenter software architecture comprises:

identifying, by the system and via code compilation or syntactic parsing facilitated by one or more first preprocessor directives, a tree hierarchy of the desktop application; and synthesizing, by the system and via code introspection and data type association facilitated by one or more second preprocessor directives, corresponding portions of the nested model-view-presenter software architecture based on the tree hierarchy of the desktop application.

10. The computer-implemented method of claim 8, wherein the client device compiles the inner view, the inner presenter, and the lite version of the desktop application via Web Assembly.

11. The computer-implemented method of claim 8, wherein the lite version of the desktop application includes metadata of the desktop application and resultant data outputted by the desktop application.

12. The computer-implemented method of claim 8, wherein the lite version of the desktop application excludes underlying data computation algorithms of the desktop application.

13. The computer-implemented method of claim 8, wherein the lite version of the desktop application includes data exploration tools of the desktop application.

14. The computer-implemented method of claim 8, wherein the desktop application is associated with a scientific instrument.

15. A computer program product for facilitating desktop-to-cloud application migration, the computer program product comprising a non-transitory computer-readable memory having program instructions embodied therewith, the program instructions executable by a processor to cause the processor to:

access a computer program;

identify, via code compilation or syntactic parsing facilitated by one or more first preprocessor directives, a tree hierarchy of the computer program; and deploy the computer program in a nested model-view-presenter software architecture that is derived, via code introspection and data type association facilitated by one or more second preprocessor directives, from the tree hierarchy of the computer program, wherein the nested model-view-presenter software architecture comprises:

the computer program and a portion of an outer presenter hosted by a server device; and a remaining portion of the outer presenter and an outer view hosted by a client device, wherein the outer view comprises an inner view, an inner presenter, and a lite version of the computer program.

16. The computer program product of claim 15, wherein the client device compiles the remaining portion of the outer presenter and the outer view in Web Assembly.

17. The computer program product of claim 15, wherein the lite version of the computer program includes metadata of the computer program and resultant data outputted by the computer program.

18. The computer program product of claim 15, wherein the lite version of the computer program excludes underlying data computation algorithms of the computer program.

19. The computer program product of claim 15, wherein the lite version of the computer program includes data exploration tools of the computer program.

20. The computer program product of claim 15, wherein the computer program is associated with a scientific instrument.

* * * * *